US012621528B2

(12) United States Patent
Dasher et al.

(10) Patent No.: US 12,621,528 B2
(45) Date of Patent: May 5, 2026

(54) SYSTEMS AND METHODS FOR REAL-TIME SEGMENT NOTIFICATION

(71) Applicant: Adeia Guides Inc., San Jose, CA (US)

(72) Inventors: Charles Dasher, Lawrenceville, GA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 65 days.

(21) Appl. No.: 18/541,201

(22) Filed: Dec. 15, 2023

(65) Prior Publication Data

US 2025/0203161 A1      Jun. 19, 2025

(51) Int. Cl.
| | |
|---|---|
| *H04N 21/233* | (2011.01) |
| *H04N 21/2343* | (2011.01) |
| *H04N 21/25* | (2011.01) |
| *H04N 21/258* | (2011.01) |
| *H04N 21/262* | (2011.01) |
| *H04N 21/422* | (2011.01) |
| *H04N 21/43* | (2011.01) |
| *H04N 21/431* | (2011.01) |
| *H04N 21/439* | (2011.01) |
| *H04N 21/44* | (2011.01) |
| *H04N 21/442* | (2011.01) |
| *H04N 21/466* | (2011.01) |
| *H04N 21/472* | (2011.01) |
| *H04N 21/482* | (2011.01) |

(52) U.S. Cl.
CPC ....... *H04N 21/4668* (2013.01); *H04N 21/431* (2013.01); *H04N 21/4394* (2013.01); *H04N 21/44008* (2013.01); *H04N 21/44218* (2013.01); *H04N 21/4826* (2013.01)

(58) Field of Classification Search
None
See application file for complete search history.

(56) References Cited

U.S. PATENT DOCUMENTS

| | | | |
|---|---|---|---|
| 9,201,627 B2 | 12/2015 | Tam et al. | |
| 11,451,874 B2 | 9/2022 | Merced et al. | |
| 2008/0250023 A1* | 10/2008 | Baker | H04N 21/47217 707/999.102 |
| 2021/0133160 A1* | 5/2021 | Craft | G06F 16/148 |
| 2023/0283495 A1* | 9/2023 | Liu | G06V 30/10 709/204 |

OTHER PUBLICATIONS

Dhananjay Lal, et al. "Systems and Methods for Providing Simultaneous Display of Portions of a Media Asset", U.S. Appl. No. 18/368,700, filed Sep. 15, 2023.

* cited by examiner

*Primary Examiner* — Brian T Pendleton
*Assistant Examiner* — Jean D Saint Cyr
(74) *Attorney, Agent, or Firm* — HG LAW LLP

(57)      ABSTRACT

There are provided systems and methods for providing real-time media topic notifications. In particular, a selection of a topic within a media stream is received from a user associated with a first user device in an environment. User preferences for the selected upcoming media topic is received from the user via the first user device. A status of the upcoming media topic within the media stream is determined to cause a playing of the upcoming media topic. One or more actions to indicate the playing of the upcoming media topic to the user is executed based on the user preferences.

20 Claims, 12 Drawing Sheets

200

SYSTEM
108

| PROCESSOR(S) 202 | MEMORY 204 | INTERFACE(S) 206 |

PROCESSING MODULES 208

| CONTENT ANALYSIS MODULE 212 | SPEECH-TO-TEXT CONVERSION MODULE 214 |
| TOPIC SELECTION MODULE 216 | TIMELINE MANAGEMENT MODULE 218 |
| MONITORING AND NOTIFICATION MODULE 220 | MULTI-DEVICE SUPPORT MODULE 222 |
| EXTERNAL NOTIFICATION SERVICES MODULE 224 | OTHER MODULE(S) 226 |

DATABASE
210

400A

CONTENT INGESTION 402

IMAGE ANALYSIS 414

MONITOR FOR DIALOGUES 404

CONTENT SUBJECT IDENTIFIED? 416

IS DIALOGUE DETECTED? 406

NO

NO

YES

SPEECH-TO-TEXT CONVERSION 408

NLP ANALYSIS 410

KEYWORD IDENTIFICATION 412

YES

TOPIC GENERATION 418

TOPIC SELECTION 420

A

400C —

600C

```
#EXTM3U
#EXT-X-VERSION:3
#EXT-X-TARGETDURATION:10
#EXT-X-MEDIA-SEQUENCE:30
#EXT-X-PLAYLIST-TYPE:VOD
#EXT-X-FOLLOWED-TOPIC:Start
#EXT-X-TOPIC-THUMBNAIL-URL:https://abc.com/topic-
thumbnail.jpg
#EXT-X-UI-COLOR:#FF5733
#EXTINF:10,
fileSequence30.ts
#EXTINF:10,
fileSequence31.ts

#EXTINF:10,
fileSequence32.ts
#EXTINF:10,
fileSequence33.ts
#EXTINF:10,
fileSequence34.ts
#EXT-X-FOLLOWED-TOPIC:End
#EXTINF:10,
fileSequence35.ts
#EXT-X-ENDLIST
```

FIG. 6C

SYSTEMS AND METHODS FOR REAL-TIME SEGMENT NOTIFICATION

BACKGROUND

The present disclosure relates to the field of media content tracking and interaction, and more particularly, to systems and methods for detecting and providing notifications related to upcoming media segments in a media stream in real-time to the user.

SUMMARY

Live television transmissions have conventionally used a strategy of teasing upcoming segments to engage viewers. This strategy involves a brief preview of intriguing content slated for later segments of a program with the primary intent of retaining the attention of the viewer. However, in real-world scenarios, viewers often find themselves distracted or preoccupied, leading to missed content, even if it was eagerly anticipated. While certain viewers might have access to replay features, sifting through an entire broadcast to locate a specific teased segment can be cumbersome.

Existing approaches in the realm of enhancing live viewing experiences have provided interactive media guidance, e.g., allowing users to track and replay content that has already been aired. While these existing approaches may improve the viewer experience, they fail to provide an effective mechanism for viewers to track and access teased segments or topics of interest in real-time.

Therefore, there is a need for a solution that seamlessly connects these enticing previews with the actual viewing experience, making content more accessible, and thus more captivating to the viewer. Accordingly, systems and methods are disclosed herein to improve upon and further overcome the shortcomings of existing systems and methods.

The present disclosure relates to a field of media content tracking and interaction, and more particularly, to systems and methods for detecting and providing notifications related to upcoming media segments in a media transmission in real-time.

In a first aspect of the disclosure, there is provided a method for providing real-time notifications of media topics within a media stream, the method comprising: determining, using control circuitry, a topic in a segment, e.g., an upcoming segment, or a portion of the content, of a media content item, e.g., a currently presented media content item; determining, using control circuitry, whether the topic of the segment matches a stored topic setting, for example a user preference; in response to determining that the topic matches the stored topic setting, generating, using control circuitry, a timeline indicating a presentation status of the segment; determining, using control circuitry, whether the segment is being currently presented, for example, by performing real time analysis of a live transmission or streamed content; and in response to determining that the segment is being currently presented, updating, using control circuitry, the presentation status of the segment on the timeline, for example, adding timestamps/timecodes to the timeline.

In some examples, the method further comprises generating a timeline of segments that are 'Coming Up.' In this way, an upcoming topic(s) can be selected or subscribed to. The method may further comprise updating a progress bar to reflect the chosen topic(s). In this way, users are presented with available topics later in the show, as the show progresses.

In some examples, the method further comprises executing one or more actions to indicate the playback of the upcoming media topic to the user based on user preferences. In some examples, the one or more actions comprise one or more of flashing of an indicator on a user interface of the first user device, increasing a volume of the first user device, altering a graphical representation of the selected upcoming media topic on the user interface of the first user device, sending a notification to the user across one or more second user devices within the environment based on the user preferences, and routing the playback of the upcoming media topic to the one or more second user devices based on the user preferences.

In some examples, the method further comprises determining a location of the user within the environment, determining a presence of the user in proximity to a second user device in the environment based on the location of the user, wherein the location of the user is outside a predetermined distance range from a location of the first user device; and triggering the second user device to playback the media content item corresponding to the selected upcoming media topic based on the determination of the presence of the user in proximity of the second user device.

In some examples, triggering, by the control circuitry, the second user device may include dynamically generating, by the control circuitry, configuration data corresponding to the second user device, wherein the configuration data may include a start time and an end time of a portion of the media content item corresponding to the selected upcoming media topic; and transmitting, by the control circuitry, the configuration data to the second user device to initiate playback of the portion of the media content item corresponding to the selected upcoming media topic on the second user device.

In some examples, determining the end time of a topic in a live broadcast in advance is difficult or requires some foresight, however, once it is determined, then that information can be used for users that are watching a rebroadcast, a VOD version, or even when they're time-shifting; e.g., they joined the broadcast an hour late, but it is being recorded so they start watching from the beginning and jump to the live content at any point. The end time can be determined in real-time, at which point the streaming to a second device can be terminated. In this way, the system can send updated configuration data to the second device, when it is determined that the show has moved on to new topic or in response to detecting an advertisement break. In other examples, if advertisement breaks are known in advance then this information can be used as the end time until more accurate information is determined.

In some examples, triggering, by the control circuitry, the second user device may include transmitting, by the control circuitry via a central gateway, a multicast address to the second user device; and routing, by the control circuitry via the central gateway, a portion of the media content item corresponding to the selected upcoming media topic on the second user device based on the multicast address.

In some examples, the first and second user devices may be linked through a user profile or a user identification, ID. For example, a user may be watching on a TV streaming service or streaming aggregator, and select a topic to follow on at least one device linked to that user ID. Thereafter, the topic can follow them on all their corresponding devices, such as their smartphone, another TV hub, a home hub, or the like.

In some examples, in response to determining the status of the upcoming media topic, the method may further include receiving, by the control circuitry, a user proximity status of the user from a second user device within the environment; and routing, by the control circuitry, a portion of the media content item corresponding to the upcoming media topic on the second user device based on the user proximity status.

In some examples, in response to receiving, by the control circuitry, the selection of the upcoming media topic, the method may further include generating, by the control circuitry, a timeline of the upcoming media topic as an icon associated with an indicator, wherein the indicator may correspond to the status of the upcoming media topic; and displaying, by the control circuitry, the timeline as an overlay on the media content item on a user interface of the first user device.

In some examples, the method may further include dynamically updating, by the control circuitry, the status of the upcoming media topic based on an amount of time elapsed since the detection of the playback of the upcoming media topic.

In some examples, the user preferences may include at least one of identifiers of one or more second user devices for sending a notification of the playback of the upcoming media topic, interruption times, interruption preferences, and at least one user-preferred media topic.

In some examples, the method may further include generating, by the control circuitry, a set of recommendations of subsequent media topics for the user based at least on the selected upcoming media topic.

In some examples, the method may further include detecting, by the control circuitry, one or more upcoming media topics within the media content item; and displaying, by the control circuitry, the one or more upcoming media topics on a user interface of the first user device.

In some examples, detecting, by the control circuitry, the one or more upcoming media topics may include analyzing, by the control circuitry, the media content item and synchronously performing at least one of converting, by the control circuitry, audio information of the media content item into a textual format; analyzing, by the control circuitry, visual transitions in the media content item; and processing, by the control circuitry, at least one of the textual format and the visual transitions to identify one or more keywords or phrases indicating the one or more upcoming media topics within the media content item. In some examples, the media topics may also be a part of the program metadata; e.g., metadata related to an episode of a talk show might display a list of guests that will appear on the show, but not necessarily the order of the talk show guests' appearance on the show.

In a second aspect of the disclosure, there is provided a system for providing real-time notifications of media topics within a media content item, where the system includes a control circuitry, and a memory operatively coupled with the control circuitry, where the memory includes control circuitry-executable instructions which, when executed, cause the control circuitry to perform the methods discussed herein.

In a third aspect of the disclosure, there is provided a non-transitory computer-readable medium having processor-executable instructions that cause a processor to perform operations of the method discussed herein.

It should be noted that examples of the first aspect are compatible with examples of the second and third aspect, unless explicitly stated otherwise.

Accordingly, there are presented herein methods and systems a system and method designed to bridge an existing gap between the enticing teaser segments in media streams and a viewer's real-time access to them. The methods and systems combine real-time analysis, dynamic user interface enhancements and personalization, and intelligent content routing to enable viewers to select from one or more upcoming media topics within the media stream, allowing them to follow or subscribe to the selected one or more media topics across multiple devices. Upon determining or detecting a broadcast of the selected media topic, the systems provide clear indications by, potentially flashing a screen, adjusting a volume, or sending notifications. Additionally, the system may re-route the media stream to devices near the viewer, thereby ensuring a continuous and a synchronized viewing.

BRIEF DESCRIPTION OF THE DRAWINGS

Embodiments are further described hereinafter with reference to the accompanying drawings, in which:

FIG. 6C illustrates an example manifest file created for a media stream, in accordance with examples of the present disclosure;

DETAILED DESCRIPTION

Figure 1:
FIG. 1 illustrates an example network environment in which examples of the present disclosure may be implemented.
Figure 1:
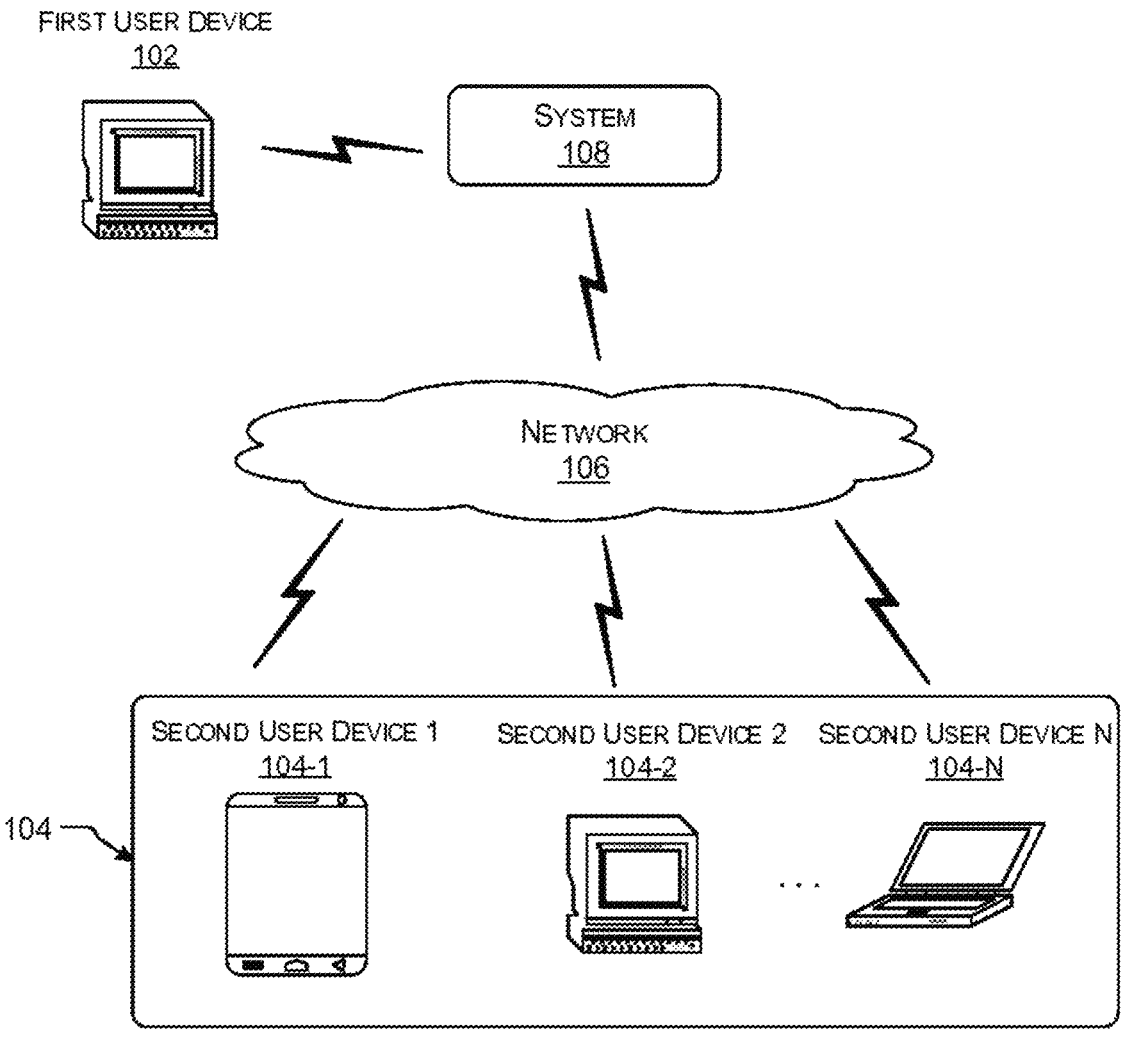

Examples of the present disclosure relates to the domain of media content tracking and interaction, and more particularly, to systems and methods for detecting and providing notifications related to upcoming media segments in a media stream in real-time. The system detects upcoming media topics within a media stream, allowing users to follow chosen topics. An arrival status (e.g., a presentation status) of the chosen topics may be presented on a timeline, thereby allowing tracking and notifying users when specific media related to the chosen topics is being or will be presented. In some examples, the notifying may happen by virtue of, but not limited to, a flashing a screen of a user device, altering a volume of the user device, altering a graphical representation of the chosen topics on the timeline. In some examples, users may be notified using a plurality of devices when those topics arrive (or about to arrive) within the media stream, and the topics in the media stream may be displayed on devices which have been selected to continue viewing the media stream. In some examples, just the audio relating to the topic may be played. In some examples, the notification to users may be context-based. For example, measuring the ambient light of a room to determine if activation of a notification by flashing a screen of a user device would be an effective way to notify the user.

In some examples, metadata may be transmitted to a streaming service provider or a cloud provider to be incorporated into media stream metadata for future restreams or when the user is watching a recorded version of the media stream. In some examples, specific metadata that is useful to the methods herein is transmitted and/or saved, and other metadata is not. For example, if a user has selected the topic of a specific celebrity, metadata related to that celebrity for a talk show may be saved for use during a future viewing session.

In some examples, the system may, when enabled through one or more user preferences or settings, turn on an automatic follow session for media topics which are like or similar to the media topics which a user has already chosen to follow. For example, if a user chooses to be informed when certain types of topics change within a late-night talk show, the system may prompt the user if they wish to enable the follow functionality for subsequent viewings of the same media stream (e.g., a different episode of the late-night talk show).

In some examples, the system may use Natural Language Processing (NLP), Computer Vision (CV), and Machine Learning (ML) techniques to detect and analyze the media stream in real-time, which enables the identification of upcoming media topics within the media stream as well as detect when the actual topic is being broadcasted. By allowing users to follow specific media topics and receive notifications related to those media topics, the system provides a personalized and interactive media consumption experience. This helps users to stay engaged with the media content that interests them the most. The ability to notify users across a plurality of devices and automatically display live media stream on the detected devices enhances the accessibility and convenience of consuming media content. Users can seamlessly switch between devices. In some examples, transmitting metadata to streaming service providers or cloud providers contributes to the enrichment of media stream metadata, thereby improving recommendations and search capabilities for users.

In accordance with examples of the present disclosure, the disclosed system enables users to discover and engage with media content that aligns with their interests more effectively, thereby leading to increased user satisfaction and content retention. By providing notifications and personalized follow sessions, users are more likely to stay engaged with media stream, resulting in increased user loyalty and prolonged viewing or listening sessions. Users can access media content and notifications on multiple devices, making it easy for them to seamlessly transition between, for example, a television, smartphone, or tablet.

Various examples of the present disclosure will be explained in detail with reference to FIGS. 1-8.

FIG. 1 illustrates an example network environment 100 in which examples of the present disclosure may be implemented.

Referring to FIG. 1, the network environment 100 includes a first user device 102, and one or more second user devices (104-1, 104-2 . . . 104-N) operated by a user (not shown). The network environment 100 includes a system 108 communicatively coupled to the first user device 102 and the one or more second user devices (104-1, 104-2 . . . 104-N) via a network 106. It may be appreciated that the one or more second user devices (104-1, 104-2 . . . 104-N) may be collectively referred as the second user devices 104 and individually referred as the second user device 104. It may be appreciated that the first user device 102 and the second user device 104 may be collectively referred as user device or user devices (102, 104). Further, it may be appreciated that there may be any number of users operating any number of user devices (102, 104) within the network environment 100. In some examples, multiple users may operate a same user device (102, 104).

In some examples, the first user device 102 may render a graphical user interface on the first user device 102 such that a user of the first user device 102 may communicate with the system 108 via the graphical user interface rendered on the first user device 102. The graphical user interface may be rendered on the first user device 102 under control of the system 108.

In some examples, the user device (102, 104) may include, but is not limited to, a handheld wireless communication device (e.g., a mobile phone, a smart phone, and so on), a wearable computer device (e.g., a head-mounted display computer device, a head-mounted camera device, a wristwatch computer device, and so on), a Global Positioning System (GPS) device, a laptop computer, a tablet computer, a television (TV), or another type of portable computer, and/or any other type of user device (102, 104) with wireless communication capabilities, and the like. In some examples, the user device (102, 104) may include, but is not limited to, any electrical, electronic, electromechanical, or equipment, or a combination of one or more of the above devices such as virtual reality (VR) devices, augmented reality (AR) devices, laptop, a general-purpose computer, desktop, personal digital assistant, tablet computer, mainframe computer, or any other computing device, wherein the user device (102, 104) may include one or more in-built or externally coupled accessories including, but not limited to, a visual aid device such as camera, audio aid, a microphone, a keyboard, and input devices for receiving input from the user such as touchpad, touch-enabled screen, electronic pen, and the like. Further, the user device (102, 104) may include, but not be limited by, intelligent, multi-sensing, network-connected devices, that can integrate seamlessly with each other and/or with a central server or a cloud-computing system or any other device that is network-connected.

In accordance with examples of the present disclosure, the system 108 may include a combination of real-time analysis, dynamic user interface enhancements, and intelligent content routing to enhance a live viewing experience of the user. System 108 enables a viewer (e.g., the user) of a live media stream (or recorded media stream) to choose from a plurality of media topics (interchangeably referred to as segments) which may have been identified by system 108 as upcoming within the live media stream. The user may choose to select and follow a media topic(s) and indicate the user devices (102, 104) where they want to follow the media topic(s). For example, the user may want to follow the media topic(s) only on the first user device 102 (e.g., TV), or on second user devices 104 which may be able to detect a presence of the user within the network environment 100 (or a viewing environment). It may be appreciated that the second user devices 104 which may be able to detect the presence of the user may be referred as "presence user devices" throughout the disclosure for the sake of brevity. In some examples, the presence user devices 104 may include, but not limited to, a mobile device or a smart home speaker, or any other user device 104 as discussed above. Upon selection of the media topic(s), various user interface (UI) elements may be presented to the user, via the first user device 102 or the presence user devices 104 to give an indication of the upcoming media topics, and whether the media topics have been discussed in the media stream. When a selected media topic is detected in the live broadcast or the media stream, the system 108 may provide an indication on a timeline and may flash an indicator on a screen of the first user device 102 (e.g., the TV screen), raise volume of the first user device 102, or send notifications to the user via the user devices. In some examples, a push notification, a short message service (SMS), smart home notifications (e.g., blinking lights), or other notification mechanisms may be used by system 108 to notify the detection of the selected media topic. This ensures that the user is informed about the detected media topics, regardless of their engagement with the first user device 102. In some examples, a portion of the media stream may be initiated for playback to the second user devices 104 which are in close proximity to the user, for example, to an audio-only device such as a smart speaker or to the user's mobile phone if they are not near the first user device 102, maintaining quality and synchronization. In some examples, metadata generated from an initial viewing and following of media topics may be transmitted to a cloud or a streaming service provider for incorporation into metadata for the media stream. In some examples, the user may be able to follow subsequent topics within subsequent viewings of similar or related media streams.

In some examples, the system 108 may be implemented as a cloud server which may execute operations through web applications, cloud applications, hypertext transfer protocol (HTTP) requests, repository operations, file transfer, and the like. In some examples, system 108 may be implemented as a plurality of distributed cloud-based resources by use of several technologies that are well known to those skilled in the art.

In some examples, the functionalities of system 108 may be incorporated in its entirety or at least partially in a server (not shown), without departure from the scope of the disclosure. The server may be implemented as a cloud server which may execute operations through web applications, cloud applications, HTTP requests, repository operations, file transfer, and the like. Other examples of the servers may include, but are not limited to, a database server, a file server, a web server, a media server, an application server, a mainframe server, a cloud server, or other types of servers. In one or more examples, the server may be implemented as a plurality of distributed cloud-based resources by use of several technologies that are well known to those skilled in the art.

Referring to FIG. 1, the first user device 102 may store and execute a client-side application that presents, to the user, one or more user interfaces. The client-side application may interact with a server-side application or the system 108.

In some examples, the system 108 may be remote from the user devices (102, 104) and communicatively coupled to the user devices (102, 104) in a secure manner via the network 106. In some examples, network 106 may include, but is not limited to, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. Network 106 may also include, by way of example but not limitation, one or more of a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, or some combination thereof. In some examples, network 106 may include, but is not limited to, the Internet, a cloud network, a Wireless Fidelity (Wi-Fi) network, a Personal Area Network (PAN), a Local Area Network (LAN), or a Metropolitan Area Network (MAN). Various components in the network environment 100 may be configured to connect to the network 106, in accordance with various wired and wireless communication protocols.

Although FIG. 1 shows exemplary components of the network environment 100, in other examples, the network environment 100 may include fewer components, different components, differently arranged components, or additional functional components than depicted in FIG. 1. Additionally, or alternatively, one or more components of the network environment 100 may perform functions described as being performed by one or more other components of the network environment 100.

Figure 2:
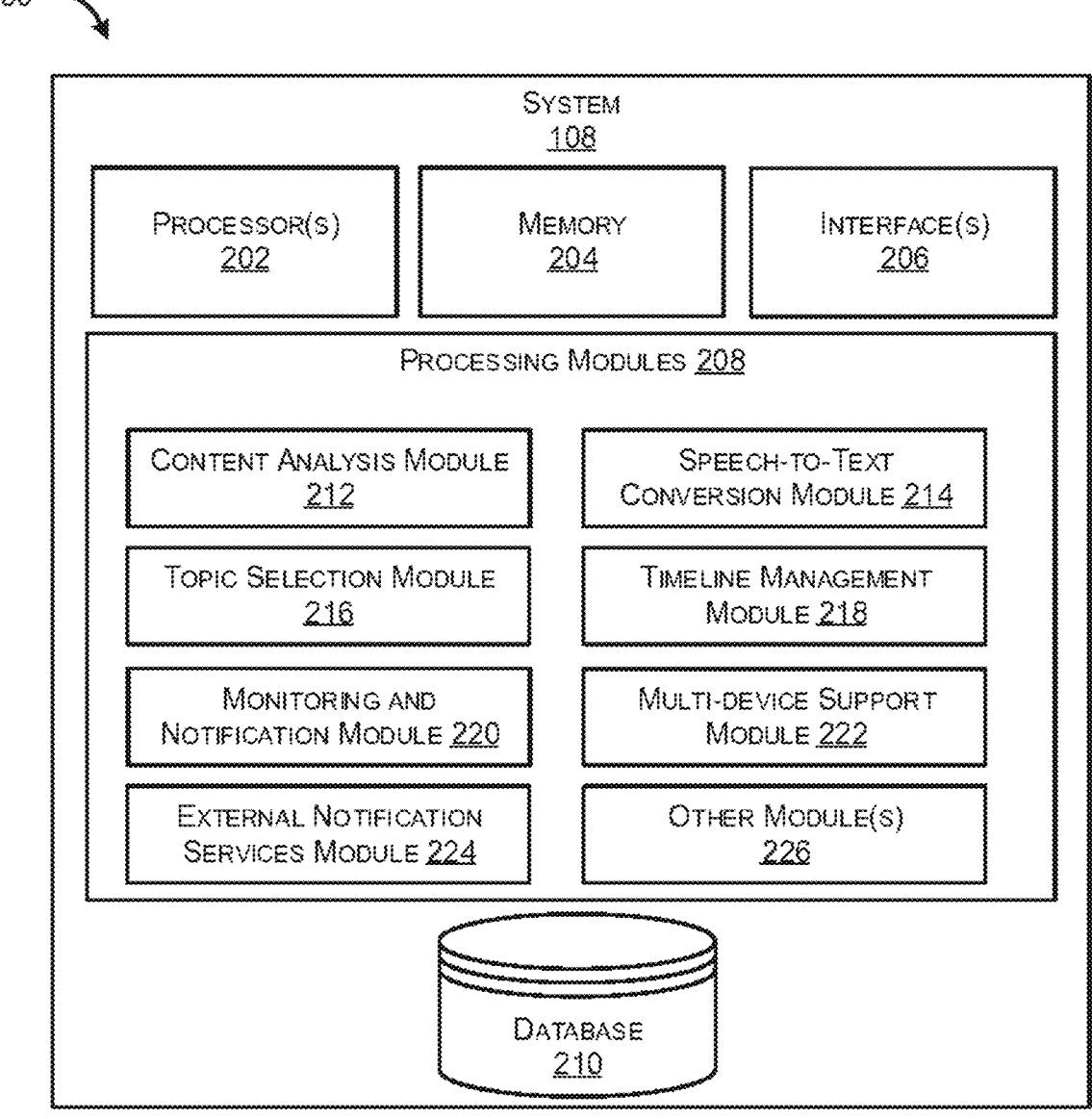
FIG. 2 illustrates an example block diagram of a proposed system, in accordance with examples of the present disclosure.

FIG. 2 illustrates an example block diagram 200 of a proposed system (e.g., 108), in accordance with examples of the present disclosure.

Referring to FIG. 2, system 108 may include, but is not limited to, one or more processor(s) 202, a memory 204, an interface 206, one or more processing module(s) 208, and a database 210. In some examples, the processor 202 may communicate with the memory 204. The memory 204 may consist of multiple memory units and store non-transitory instructions that the processor 202 may execute in accordance with examples of the present disclosure. In some examples, interface 206 may facilitate communication between processor 202 and external entities including, but not limited to, user devices (e.g., 102 and 104). In some examples, interface 206 may employ various communication media, such as radio, optical fibre, telephone, wire, etc. Interface 206 may also include one or more communication networks, including the Internet. Further, database 210 may be communicatively coupled with the processor 202 and the memory 204. Database 210 may store data in a structured format and provide fast access to the stored data. The processor 202 may access the database 210 to retrieve or store data as required by the present disclosure.

In some examples, the processor 202 may include suitable logic, circuitry, and interfaces that may be configured to execute program instructions associated with different operations to be executed by the system 108. In some examples, processor 202 may be implemented as one or more microprocessors, microcomputers, microcontrollers, edge or fog microcontrollers, digital signal processors, central processing units, logic circuitries, and/or any devices that process data based on operational instructions. Examples of implementations of the processor 202 may be a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or a combination thereof.

Among other capabilities, the processor 202 may be configured to fetch and execute computer-readable instructions stored in the memory 204 of the system 108. Memory 204 may be configured to store one or more computer-readable instructions or routines in a non-transitory computer-readable storage medium, which may be fetched and executed to create or share data packets over a network service. Memory 204 may comprise any non-transitory storage device including, for example, volatile memory such as Random-Access Memory (RAM), or non-volatile memory such as Electrically Erasable Programmable Read-only Memory (EPROM), flash memory, and the like.

In some examples, the interface(s) 206 may comprise a variety of interfaces, for example, interfaces for data input and output devices, referred to as input/output (I/O) devices, storage devices, and the like. The interface(s) 206 may facilitate communication for the system 108. The interface(s) 206 may also provide a communication pathway for one or more components of the system 108. Examples of such components include but are not limited to, the processing module(s) 208 and the database 210. In some examples, the database 210 may comprise data that may be either stored or generated as a result of functionalities implemented by any of the components of the system 108 such as, but not limited to, user preferences, user profile, identifiers of user devices (102, 104) associated with the user, interruption times, interruption preferences, user-preferred media topic(s), notification settings, privacy controls, viewing history, synchronization preferences, and the like.

Although the database 210 is shown as being a part of system 108, it is to be understood that in other examples, the database 210 may be separate from the system 108 and may be hosted on another server that is communicatively coupled to the system 108. In some examples, the database 210 may be cloud-hosted.

In some examples, the processing module(s) 208 may be implemented as a combination of hardware and programming (for example, programmable instructions) to implement one or more functionalities of the processing module(s) 208. In examples described herein, such combinations of hardware and programming may be implemented in several different ways. For example, the programming for the processing module(s) 208 may be processor-executable instructions stored on a non-transitory machine-readable storage medium and the hardware for the processing module(s) 208 may comprise a processing resource (for example, one or more processors), to execute such instructions. In the present examples, the machine-readable storage medium may store instructions that, when executed by the processing resource, implement the processing module(s) 208. In such examples, system 108 may comprise the machine-readable storage medium storing the instructions and the processing resource to execute the instructions, or the machine-readable storage medium may be separate but accessible to system 108 and the processing resource. In other examples, the processing module(s) 208 may be implemented by an electronic circuitry.

Referring to FIG. 2, the processing module(s) 208 may include a content analysis module 212, a speech-to-text conversion module 214, a topic selection module 216, a timeline management module 218, a monitoring and notification module 220, a multi-device support module 222, an external notification services module 224, and other module(s) 226. In some example examples, the other module(s) 226 may include, but is not limited to, a data ingestion module, or the like, within the scope of the present disclosure.

In some examples, one or more media topics, e.g., upcoming media topics, may be detected (e.g., by the content analysis module 212) within a media stream such as, but not limited to, television shows and episodes, movies, news and current events, sports events, music, weather alerts, and the like. The upcoming media topic may include, but not limited to, various subjects, themes, or specific media topics within the media stream that may interest a user. The media stream may be analyzed synchronously, e.g., in real-time (e.g., by the content analysis module 212). For example, the content analysis module 212 may be interfaced directly with an incoming signal, enabling the content analysis module 212 to analyze the media stream synchronously. In some examples, audio information of the media stream may be converted into a textual format (e.g., by the speech-to-text conversion module 214). As dialogue progresses in the live broadcast, the speech-to-text conversion module 214 may transcribe the audio information into the textual format. In some examples, visual transitions in the media stream may be analyzed (e.g., by the content analysis module 212). The textual format and/or the visual transitions may be processed (e.g., by the processor 202) to identify one or more keywords or phrases indicating the upcoming media topics within the media stream. In some examples, detecting upcoming media topics in the media stream may involve natural language processing (NLP), speech recognition, and contextual analysis to identify the one or more keywords or phrases. The one or more keywords or phrases may include, but not limited to, "coming up," "next up," "stay tuned for," "later in the show," "stay with us for," "after the break," "on this episode of," or the like, that may indicate the introduction or transition from a previous media topic (e.g., previously teased topic). In some other examples, a closed caption or other data feed technique may be used to process the textual format to identify one or more keywords or phrases. Concurrently, a Computer Vision (CV) algorithm may be used to analyze the visual transitions in the media stream, for example, but not limited to, changes in the backdrop, the introduction of new graphics, the appearance of specific individuals, or the like, thereby providing an additional layer of topic identification. It may be appreciated that system 108 continually monitors and analyzes the media stream in real-time to detect any references to the upcoming media topics. In some examples, metadata generated from the monitoring may be stored in the database 210 or transmitted to a streaming service provider (e.g., by the external notification services module 224) to be incorporated into the media stream metadata to provide similar recommendations of media topics for subsequent re-streams of the media stream.

In some examples, the identified one or more upcoming media topics may be displayed (e.g., by the processor 202) on a user interface of a first user device (e.g., 102). In some examples, a selection of an upcoming media topic within the media stream may be received (e.g., by the topic selection module 216) from a user of the first user device 102 in an environment. In some examples, user preferences or settings (e.g., for the selected upcoming media topic) may be received (e.g., by the processor 202 and stored in the database 210) from the user via the first user device 102. The user preferences may include, but are not limited to, device preferences such as identifiers of one or more second user devices (e.g., 104) for sending a notification of the playback of the upcoming media topic, interruption times, interruption preferences, at least one user-preferred media topic, notification settings including how the user may want to be notified when the selected media topic is detected, automatic follow settings, privacy controls, synchronization preferences, and the like. In some examples, a timeline of the upcoming media topic may be generated (e.g., by the timeline management module 218). The upcoming media topic may be depicted as an icon associated with an indicator corresponding to a status of the upcoming media topic. The timeline may be displayed (e.g., by the timeline management module 218) as an overlay on the media stream on a user interface of the first user device 102.

In some examples, a status of the upcoming media topic within the media stream may be determined (e.g., monitoring and notification module 220) to cause a playback of the upcoming media topic. The status of the upcoming media topic may be dynamically updated (e.g., by the monitoring and notification module 220) based on an amount of time elapsed since the detection of the playback of the media topic. This provides the user with a constant reminder of the selected media topics as well as their status such as upcoming, just mentioned, or already discussed. In some examples, in response to determining the status, one or more actions to indicate the playback of the upcoming media topic to the user may be executed (e.g., by the processor 202) based at least on the user preferences stored in the database 210 corresponding to the user. In some examples, one or more actions may include, but are not limited to, flashing an indicator on the user interface of the first user device 102, increasing a volume of the first user device 102, altering a graphical representation of the selected upcoming media topic on the user interface of the first user device 102, sending a notification to the user across one or more second user devices 104 within the environment based on the user preferences, routing the playback of the upcoming media topic on the one or more second user devices 104 based on the user preferences, and the like. In some examples, if the media topic is detected, system 108 may update the timeline to indicate that the topic has been detected along with an indicator, e.g., a timecode of the detection of the media topic.

In some examples, a location of the user within the environment may be determined (e.g., by the processor 202). A presence of the user in proximity to one of the second user devices 104 (e.g., a voice assistant) in the environment may be determined (e.g., by the multi-device support module 222) based on the location of the user. The location of the user may be outside a pre-determined distance range from the location of the first user device 102. The second user device 104 may be triggered to playback the media stream corresponding to the selected upcoming media topic based on the determination of the presence of the user in proximity of the second user device 104. It may be appreciated that the multi-device support module 222 may use suitable methods to detect the presence of the user in proximity to the second user devices 104, for example, the presence may be detected by way of a short-range link, determining a location of a remote control, or detection of a secondary camera incorporated in the second user devices 104, or the like.

Alternatively, or additionally, in some examples, a user proximity status of the user may be received (e.g., by the processor 202) from the second user device 104. For example, the second user device 104 may detect that the user wishes to replicate the media stream, for example, by receiving a voice command or responding to a gesture via incorporated sensors and/or user identification mechanism, to receive and process a request to initiate playback of the remaining portion of media stream or the selected media topic. A portion of the media stream corresponding to the selected upcoming media topic may be routed on the second user device 104 based on the user proximity status.

In some examples, contextual information during the processing (e.g., determining intent) of a voice query. For example, if the user is watching s a sports game on their living room TV, a voice query such as "what is the current score" can be determined to be related to the sports game being watched and the system can return the score associated with that game. Information or metadata about content that is being consumed can be used to disambiguate a query if the voice service, such as the natural language/intent analysis component(s) have access to electronic programming guide metadata, including topics that a user is currently subscribed to or historically subscribed to. This historical topic subscription or viewing history metadata serve as an additional data layer that is available to the NLP module/ engine and used in determining or confirming the user's intent, especially, if the user's query is related to media and television programs, including queries about sports events. The NLP module can query the user viewing history service directly via know technique such as API calls with parameters such as user ID, current time, etc. A TV streaming service and the smart speaker can be linked to the same account or share the same username or email address which are used by the user to manage such services (managing including logging in, modifying user or systems settings such as changing language settings, etc.). Therefore, the TV service makes metadata available to the NLP/intent processing module by publishing or giving access to content metadata that the TV service is currently streaming to a user device. Content metadata can include titles of the sports game (e.g., Team A vs Team B), as well as content metadata related to content that was consumed via the TV service (TV services maintain a watch history and makes that metadata available to various components of the smart assistant service including the NLP/intent analysis module).

In some examples, a playback Application Programming Interface (API) may be used to determine configuration data corresponding to the second user device 104 such as, but not limited to, supported formats, streaming protocols, and other parameters required to appropriately create a manifest file. Accordingly, the configuration data corresponding to the second user device 104 may be dynamically generated (e.g., by the multi-device support module 222). The configuration data may include, but is not limited to, a start time and an end time of a portion of the media stream corresponding to the selected upcoming media topic. The configuration data (e.g., the manifest file) to initiate the playback of the portion of the media stream on the second user device 104 may be transmitted (e.g., by the external notification services module 224) to the second user device 104. It may be appreciated that manifest file may refer to a text or a playlist that describes a list of segments or fragments of video and audio data that can be retrieved by a consume device. Additionally, the device may receive a multivariant playlists where every playlist represents a rendition and includes details about such rendition such as bitrate of the video/audio content, resolutions, server location of the segments/fragments, etc.

Alternatively, or additionally, in some examples, the multi-device support module 222 may support other methods of replicating the remaining portion or the portion related to the selected media topic such as, but not limited to, a local streaming mechanism where the second user device 104 fetches the media stream or portion thereof directly from the first user device 102. In some examples, a central gateway may be used to replicate and distribute media streams over a network broadcast protocol such as a multicast protocol. A multicast address may be transmitted (e.g., by the multi-device support module 222) via a central gateway to the second user device 104. The second user device 104 may join the multicast address. The portion of the media stream corresponding to the selected upcoming media topic may be routed on the second user device 104 via the central gateway based on the multicast address. In this way, the media stream may be streamed on the second user device 104 through the central gateway. In some examples, a central gateway module may be incorporated in the first user device 102 to act as a gateway to broadcast or stream the media stream to the second device. In some other examples, the central gateway module may be an external module.

In some examples, a set of recommendations of subsequent media topics for the user based at least on the selected upcoming media topic may be generated (e.g., by the content analysis module 212) based on the metadata corresponding to the user.

Although FIG. 2 shows exemplary components of system 108, in other examples, system 108 may include fewer components, different components, differently arranged components or additional functional components than depicted in FIG. 2. Additionally, or alternatively, one or more components of the system 108 may perform functions described as being performed by one or more other components of the system 108.

Figure 3:
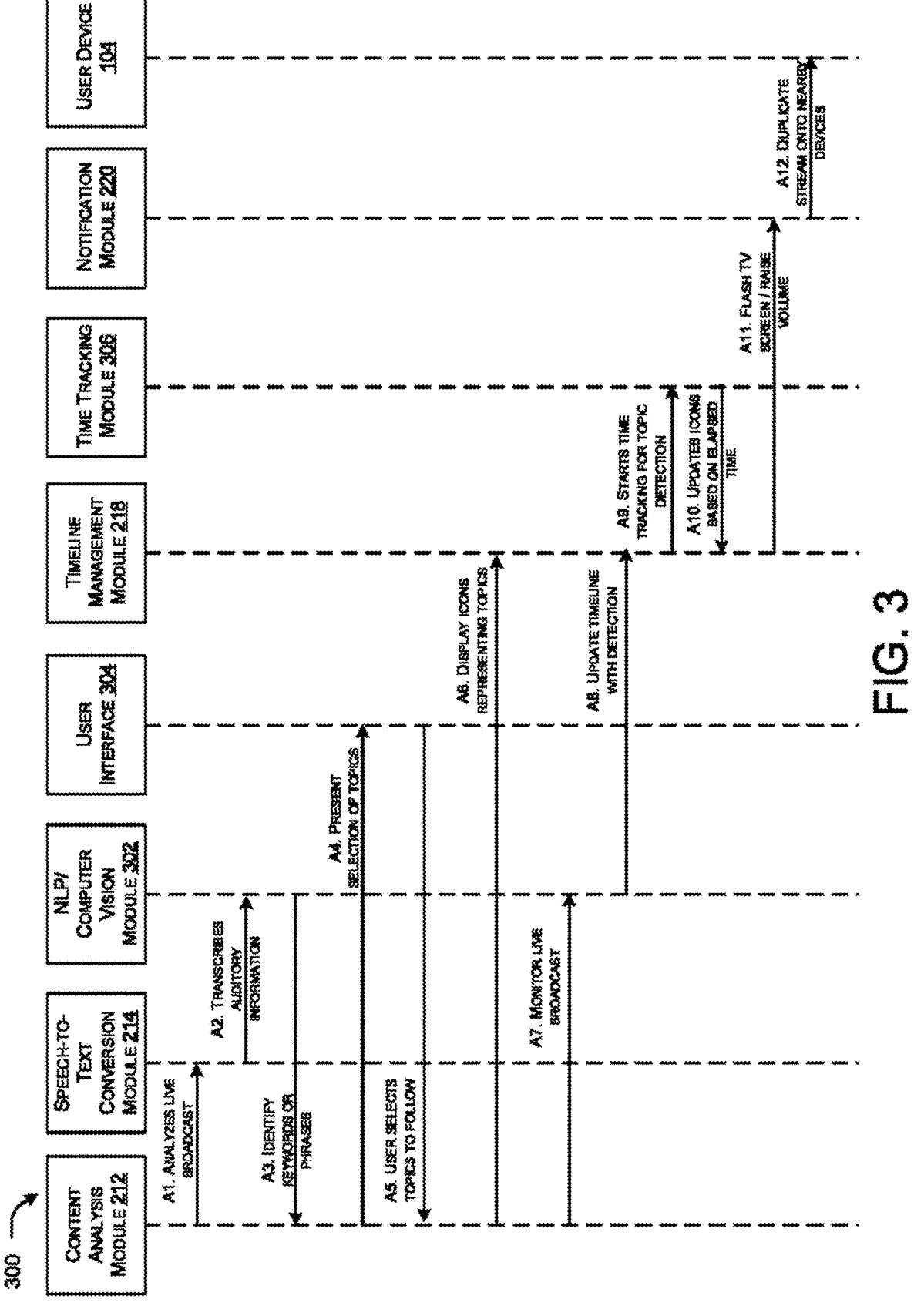
FIG. 3 illustrates a sequence diagram for implementing a proposed system, in accordance with examples of the present disclosure.

FIG. 3 illustrates a sequence diagram 300 for implementing a proposed system (e.g., 108), in accordance with examples of the present disclosure.

In accordance with examples of the present disclosure, a system (e.g., 108), as disclosed herein, pertains to the field of media stream tracking and interaction, with a specific focus on identifying upcoming media topics within a live media stream and notifying users accordingly. System 108 uses NLP, CV, and Machine Learning (ML) techniques for real-time monitoring and topic detection. System 108 allows users to follow media topics within the media stream, represents a status of the followed media topics on a timeline, tracks and notifies users when a specific media topic is presented, automatically displays the media stream or audio portion of the media stream on presence user devices (e.g., 104), transmits metadata corresponding to the user to streaming service providers or cloud providers for future recommendations, allows users to set preferences enabling automatic follow sessions for media topics, and the like.

Referring to FIG. 3, at step A1, the incoming live media stream may be synchronously analyzed by the content analysis module 212. At step A2, audio information, e.g., live spoken dialogue within the media stream may be converted into a textual format (e.g., parse-able text) in real-time for further processing by the speech-to-text conversion module 214.

At step A3, keywords or phrases indicative of upcoming or teased media topics may be identified by an NLP and Computer Vision (CV) module 302. In some examples, system 108 uses the NLP and CV module 302 to identify visual transitions in the media stream including, but not limited to, backdrop changes, new graphic introductions, the appearance of specific individuals, or the like. In some examples, the NLP and CV module 302 may implement CV techniques to identify when media topics change by detecting subjects within a video frame.

Referring to FIG. 3, at step A4, the topic selection module 216 may detect a range of media topics based on an output from the NLP and CV module 302 to provide the media topics to a user for a selection via a user interface 304 of the first user device 102. The user may be presented with a range of media topics to select from within the live media stream. At step A5, the selection of an upcoming media topic may be received by the content analysis module 212 from the user.

At step A6, the timeline management module 218 may display the selected media topics on a visual timeline on the user interface 304 of the first user device 102, dynamically updating a status of each media topic based on a real-time analysis of the live media stream. In some examples, the selected media topics may be displayed on the timeline, for example, when the user interacts with the first user device 102 via a remote, to display a topic icon or thumbnail and an indicator within the timeline displaying the status of the topic (e.g., upcoming, already discussed, or the like).

Referring to FIG. 3, at step A7, the content analysis module 212 may monitor the live media stream in real-time via the NLP and CV module 302. In some examples, the NLP and CV module 302 may detect the selected media topic in the media stream. Accordingly, at step A8, the timeline may be dynamically updated with the corresponding status by the timeline management module 218.

At step A9, a time tracking module 306 may start time tracking for the selected media topics within the live media stream. At step A10, icons of the media topics may be updated on the timeline based on a time elapsed since the detection of a start of the media topic within the media stream. This ensures that the user is notified about the elapsed time for the selected media topics.

In some examples, the user may be notified about the media topics in various ways, for example, determined by user profile, user preferences, or the like. For example, the notification may be local at step A11, where the notification module 220 may flash an indicator on the user interface 304 of the first user device 102. In some other examples, the notification may be external such as, but not limited to, push notifications, SMS, or the like. In some other examples, the notification module 220 may notify the user on presence user devices 104, for example, at step A12, the notification module 220 may facilitate replication of at least a portion of the media stream corresponding to the selected media topic on presence user device(s) 104.

It will be appreciated that the steps shown in FIG. 3 are merely illustrative. Other suitable steps may be used, if desired. Moreover, the steps of FIG. 3 may be performed in any order and may include additional steps.

Figure 4A:
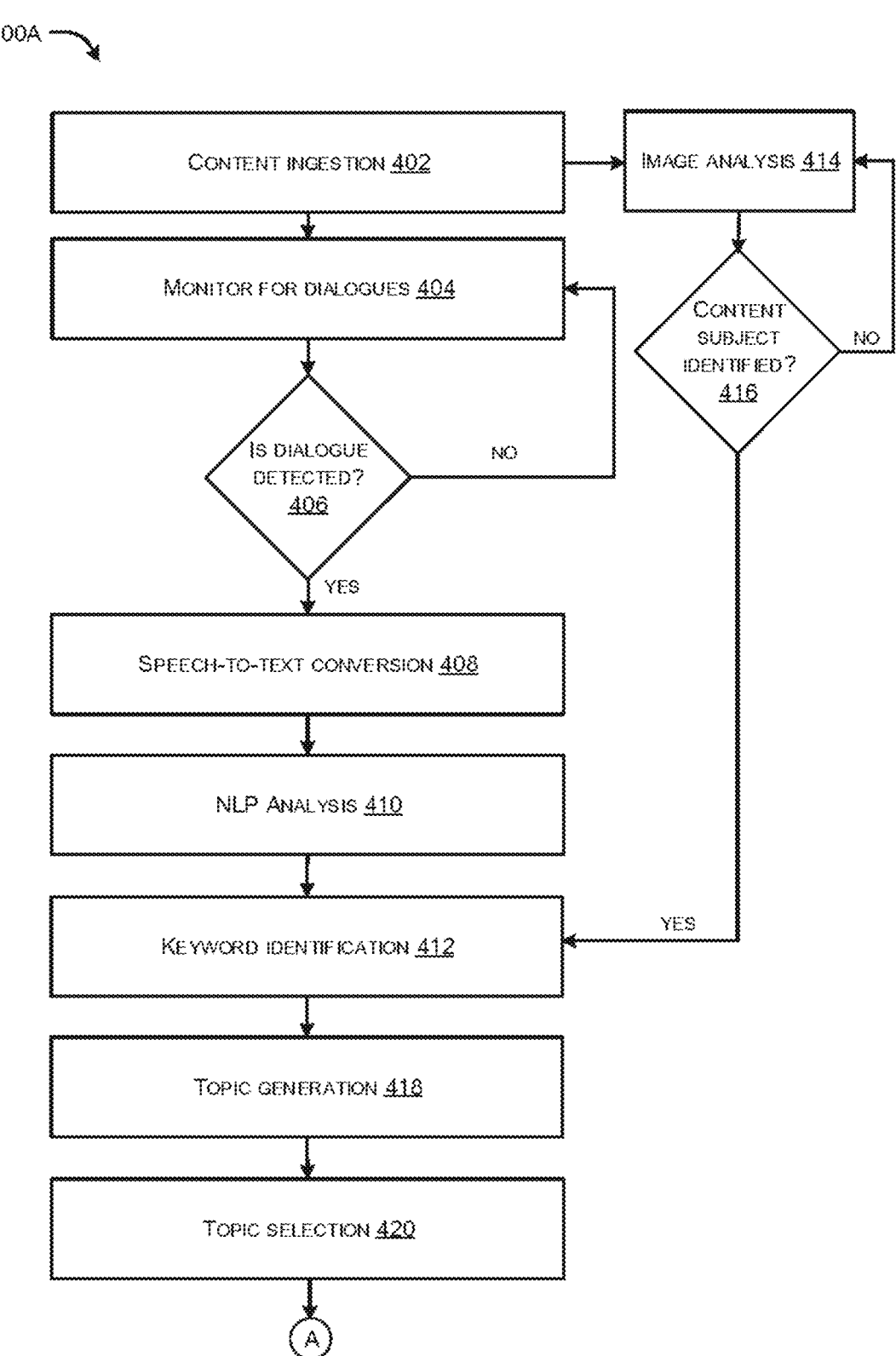
FIGS. 4A-4C illustrate a flowchart of an example method for providing real-time notifications of media topics within a media stream, in accordance with examples of the present disclosure.
Figure 4B:
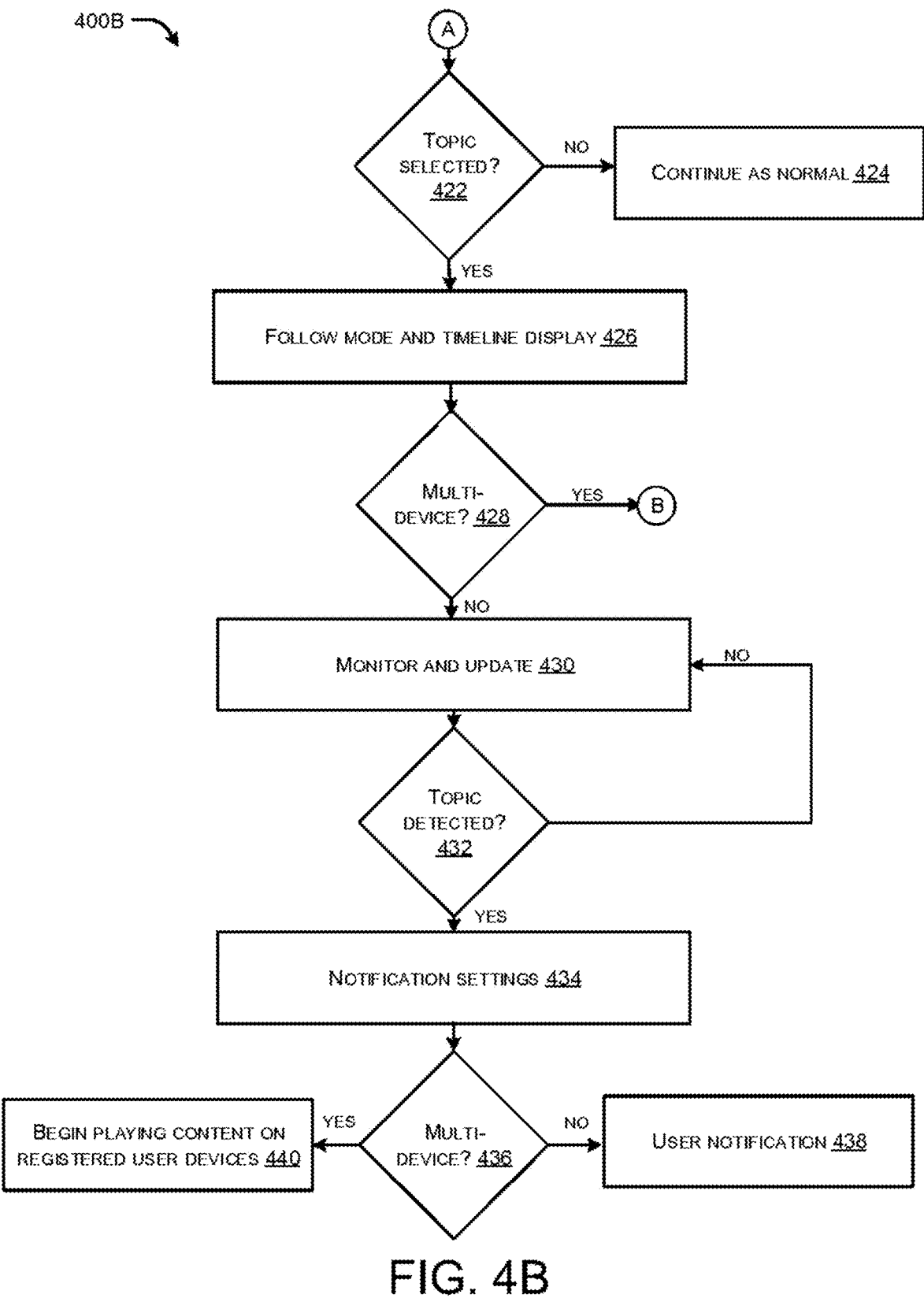
Figure 4C:
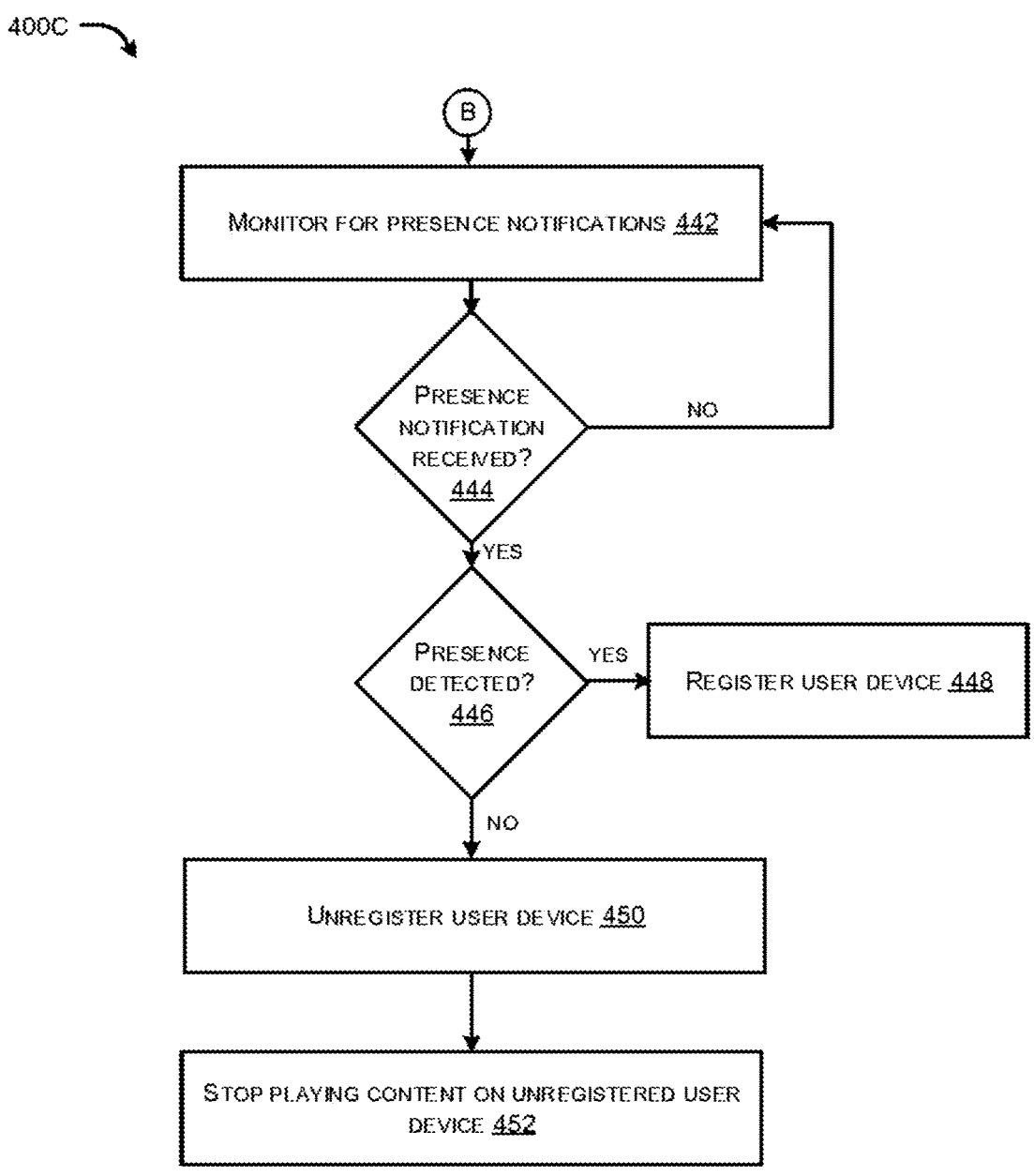

FIGS. 4A-4C illustrate a flow chart of an example method (400A, 400B, 400C) for providing real-time notifications of media topics within a media stream, in accordance with examples of the present disclosure. It may be appreciated that blocks of the method (400A-400C) may be implemented at the system 108.

Referring to FIG. 4A, at block 402, content of a media stream may be ingested and analyzed in real-time (e.g., by a content analysis module 212). At block 404, audio information or dialogues within the media stream may be monitored (e.g., by a speech-to-text conversion module 214). At block 406, the system 108 may determine if a dialogue is detected in the media stream. If the dialogue is not detected, the system 108 may continue to monitor the media stream (e.g., block 404). If the dialogue is detected, at block 408, the audio information from the media stream may be converted to a textual format (e.g., by the speech-to-text conversion module 214).

At block 410, the textual format may be analyzed by NLP techniques (e.g., by the NLP and CV module 302). It may be appreciated that suitable NLP techniques may be implemented to analyze the textual format of the media stream. At block 412, one or more keywords or phrases may be identified based on the NLP analysis. In some examples, at block 414, image frames and/or video frames of the media stream may be analyzed (e.g., by the NLP and CV module 302). At block 416, the system 108 may determine if a subject topic has been identified based on the image and/or video analysis. If the subject topic is not identified, the system 108 may continue to analyze the image and/or video frames (e.g., block 414). If the subject topic is identified, at block 412, one or more keywords or phrases may be identified.

Referring to FIG. 4A, at block 418, the system 108 may generate a list of upcoming media topics based on the analysis. At block 420, the list of upcoming media topics may be displayed to a user (e.g., on the user interface 304) via a first user device 102 for topic selection. The user may select an upcoming media topic(s) from the list.

Referring to FIG. 4B, at block 422, the system 108 may determine whether an upcoming media topic is selected by the user. If the topic is not selected, at block 424, the system 108 may continue as normal, for example, continue to monitor the media stream. If the topic is selected to be followed by the user, at block 426, a timeline may be displayed on the user interface 304 of the first user device 102 indicating the media topic as an icon along with an indicator to indicate a status of the media topic.

In some examples, at block 428, the system 108 may determine (e.g., by the multi-device support module 222) if multiple devices are supported corresponding to the user within an environment based on a set of user preferences. If multiple devices are not supported, at block 430, the system 108 may monitor the media stream and update the timeline based on detection of the selected media topics.

Referring to FIG. 4B, at block 432, the system 108 may determine if the selected media topic is detected within the media stream. If the media topic is not detected, the system 108 may continue to monitor the media stream (e.g., block 430). If the media topic is detected, at block 434, the system 108 may determine notification settings of the user for the selected media topics. In some examples, the system 108 may retrieve the notification settings for the user from a database (e.g., 210).

Based on the notification settings, at block 436, the system 108 may determine if multiple devices are supported for the user (e.g., via the multi-device support module 222). If multiple devices are not supported for the user, at block 438, the user may be notified regarding the detection of the media topic within the media stream on the first user device 102 itself. In some examples, the system 108 may alter UI elements on the first user device such as, but not limited to, flash an indicator on the user interface 304 of the first user device 102, raise a volume of the first user device 102, and the like.

Referring to FIG. 4B, if multiple devices are supported, at block 440, the system 108 may initiate playback of at least a portion of the media stream corresponding to the selected media topic on registered presence user devices (e.g., 104).

Referring to FIG. 4C, if it is determined that multiple devices are supported for the user, for example, at block 428 of FIG. 4B, the system 108 may monitor for presence notifications at block 442. In some examples, the system 108 may monitor if a user proximity status of the user is received from any presence user device 104 within the environment. In some other examples, the system 108 may determine a location of the user within the environment and determine a presence of the user in proximity to the presence user device 104. In some examples, the location of the user may be outside a pre-determined distance range from a location of the first user device 102.

Referring to FIG. 4C, at block 444, the system 108 determine if a presence notification is received. If the presence notification is not received and/or determined, the system 108 may continue to monitor for the presence notifications (e.g., block 442). If the presence notification is received and/or determined, at block 446, the system 108 may determine if the presence user device 104 is detected within the environment.

If the presence user device 104 is detected, at block 448, the presence user device 104 may be registered for the user. In some examples, based on the registration, at least a portion of the media stream may be initiated for playback at the presence user device 104. If the presence user device 104 is not detected, at block 450, the presence user device 104 may be unregistered. Accordingly, at block 452, playback of at least a portion of media stream on the unregistered user device may be stopped.

It will be appreciated that the blocks shown in FIGS. 4A-4C are merely illustrative. Other suitable blocks may be used, if desired. Moreover, the blocks of FIGS. 4A-4C may be performed in any order and may include additional operations.

Figure 5:
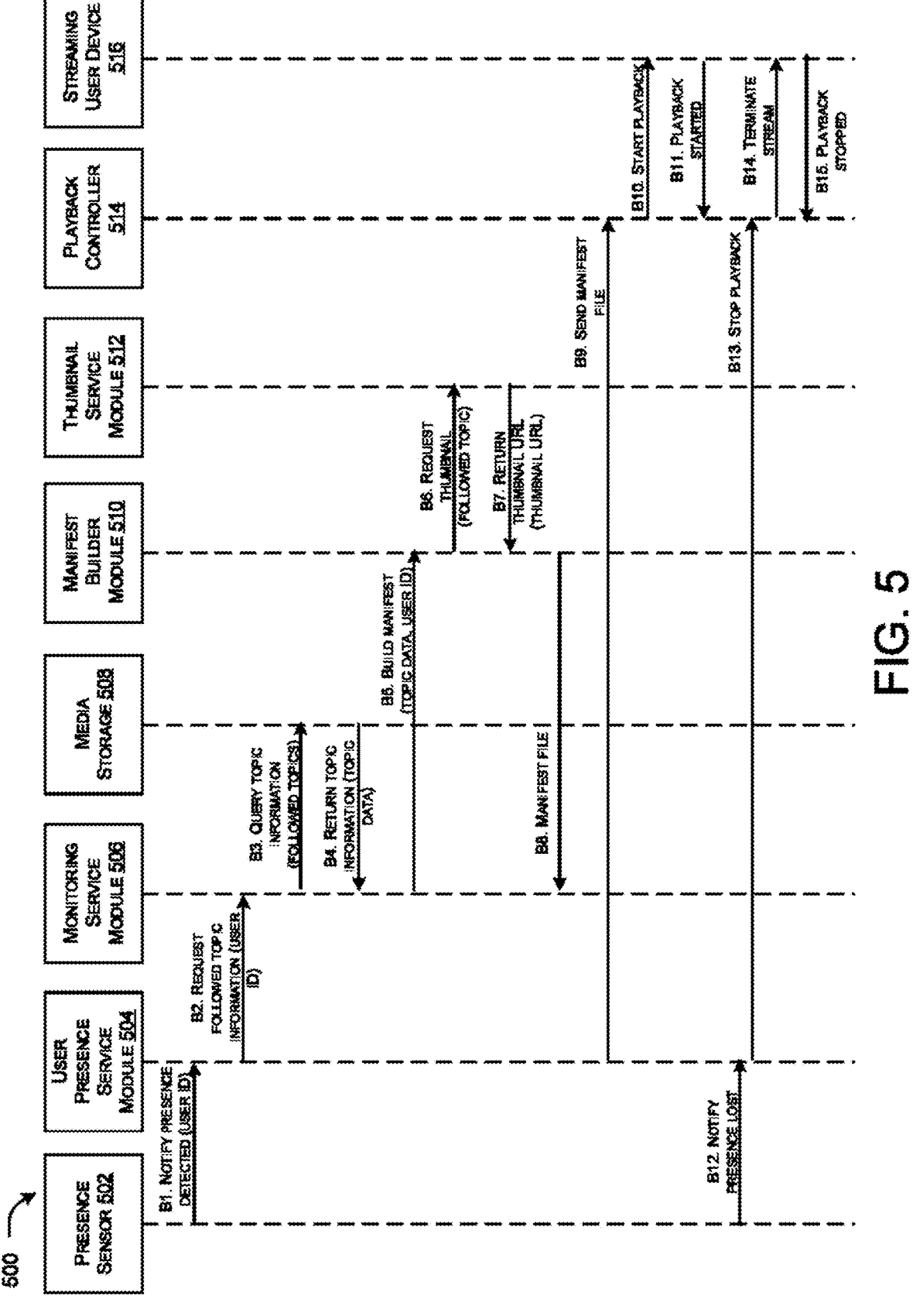
FIG. 5 illustrates a sequence diagram for generating a manifest file for a presence user device, in accordance with examples of the present disclosure.

FIG. 5 illustrates a sequence diagram 500 for generating a manifest file for a presence user device, in accordance with examples of the present disclosure. It may be appreciated that the modules depicted in FIG. 5 may be associated with or included in the system 108.

Referring to FIG. 5, at step B1, a detection of a presence of a user in proximity to a user device (e.g., 104) within an environment may be notified by a presence sensor 502 to a user presence service module 504. In some examples, an identifier of the user may be sent in the notification to the user presence service module 504.

At step B2, a request for information of followed media topic corresponding to the identifier of the user may be sent by the user presence service module 504 to a monitoring service module 506. At step B3, a query for retrieving the information of the followed media topic may be sent by the monitoring service module 506 to a media storage 508. It may be appreciated that the media storage may be implemented at a database (e.g., 210). The media storage 508 may retrieve the information of the followed media topic and return the information to the monitoring service module 506, at step B4.

At step B5, a manifest builder module 510 may generate a manifest file based on configuration data corresponding to the second user device 104. The manifest file may be generated based on media topic information and the identifier of the second user device 104. At step B6, thumbnail for the followed media topic may be requested by the manifest builder module 510 from a thumbnail service module 512. At step B7, the requested thumbnail in the form of a uniform resource locator (URL) may be sent by the thumbnail service module 512 to the manifest builder module 510. In some examples, the manifest file may be dynamically generated by the manifest builder module 510 based on the configuration data of the second user device 102, the media topic information, and the thumbnail URL.

Referring to FIG. 5, at step B8, the manifest file may be sent by the manifest builder module 510 to the monitoring service module 506. At step B8, the manifest file may be sent to a playback controller 514. At step B10, playback of at least a portion of the media stream may be initiated at a streaming user device 516 based on the manifest file. In some examples, the manifest file may be parsed by the streaming user device 516. At step B11, the playback may be started and controlled by the playback controller 514.

In some examples, at step B12, the presence sensor 502 may notify the user presence service module 504 that the presence of the user in proximity to the user device 104 is not detected. Accordingly, at step B13, the user presence service module 504 may notify the playback controller 514 to stop the playback. At step B14, the playback controller 514 may notify the streaming user device 516 to terminate the media stream. Accordingly, at step B15, the streaming user device 516 may notify the playback controller 514 that the playback is stopped.

It will be appreciated that the steps shown in FIG. 5 are merely illustrative. Other suitable steps may be used if desired. Moreover, the steps of FIG. 5 may be performed in any order and may include additional operations.

Figure 6A:
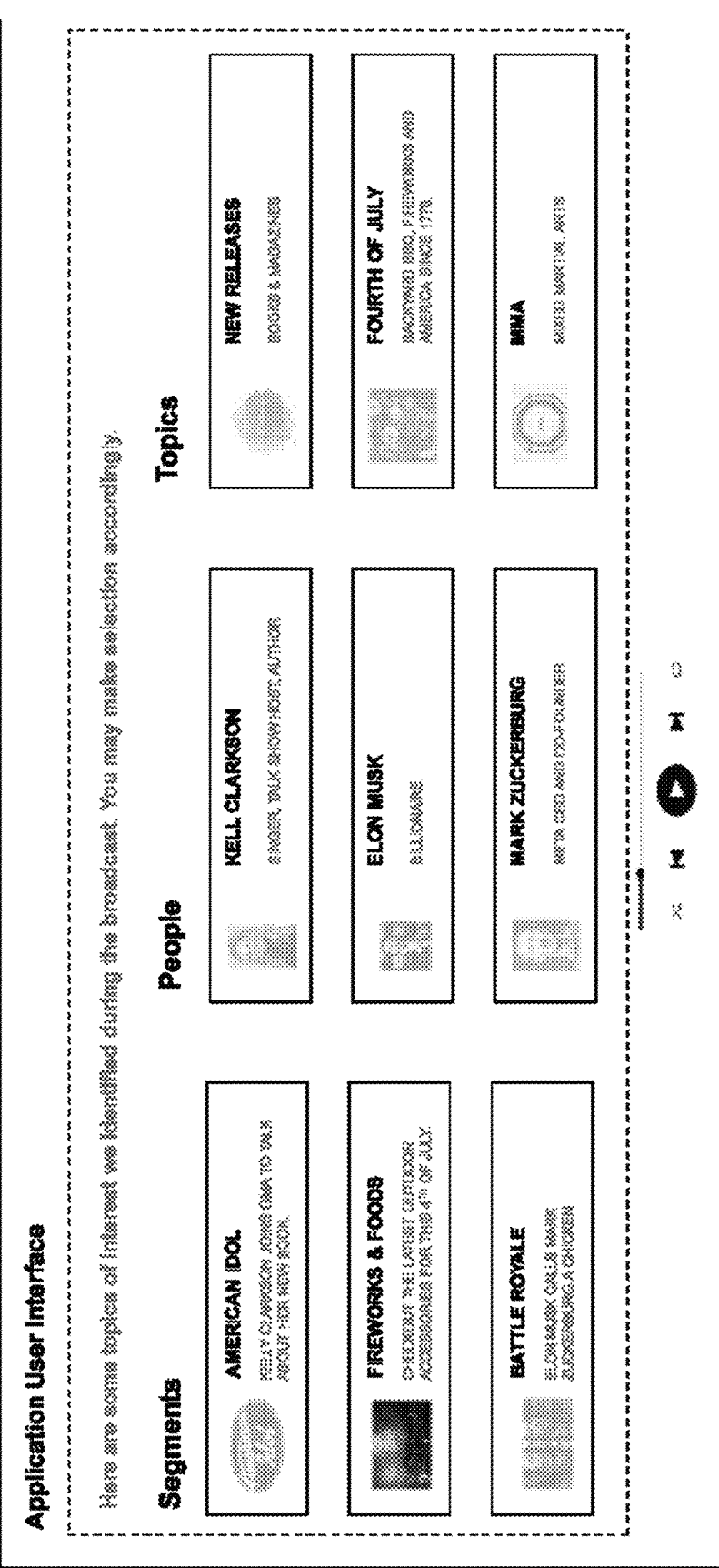
FIGS. 6A and 6B illustrate example representations of an interface of a first user device, in accordance with examples of the present disclosure.
Figure 6B:
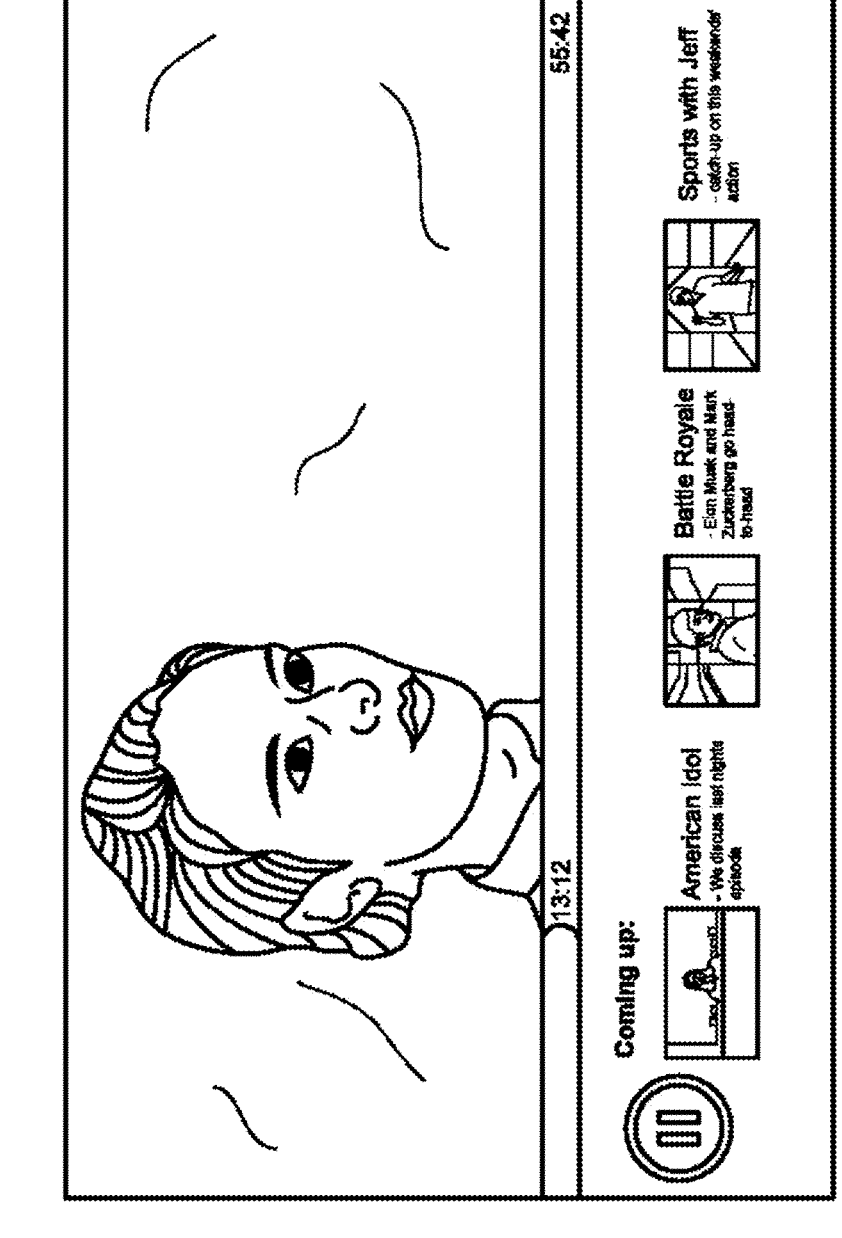

FIGS. 6A and 6B illustrate example representations (600A, 600B) of user interface of a first user device, in accordance with examples of the present disclosure.

Referring to FIG. 6A, the example representation 600A includes a user interface for presenting a list of upcoming media topics to a user, which have been detected at the beginning of a live media stream. Accordingly, the user may select one or more upcoming media topics from the list to follow on one or more user devices (102, 104).

Referring to FIG. 6B, the example representation 600B includes a user interface for presenting a timeline depicting the selected upcoming media topics as an icon. In some examples, the system comprises a timeline Management component that displays chosen topics on a visual timeline. As shown in FIG. 6B, the timeline may be dynamically updated to show the presentation status of each topic based on real-time analysis. In some examples, the chosen topics are displayed on the timeline (for example when the user selects a topic) to display a topic thumbnail and an indicator within the timeline displaying the status of the topic; the timeline may show upcoming selected topics, already presented topics, and the like.

FIG. 6C illustrates an example manifest file 600C created for a media stream, in accordance with examples of the present disclosure. In some examples, the manifest file 600C includes a thumbnail URL for a followed media topic, and additional UI elements such as an indicator color.

It should be understood that this example is intended to be non-limiting and numerous other examples of manifest files are possible.

Figure 7:
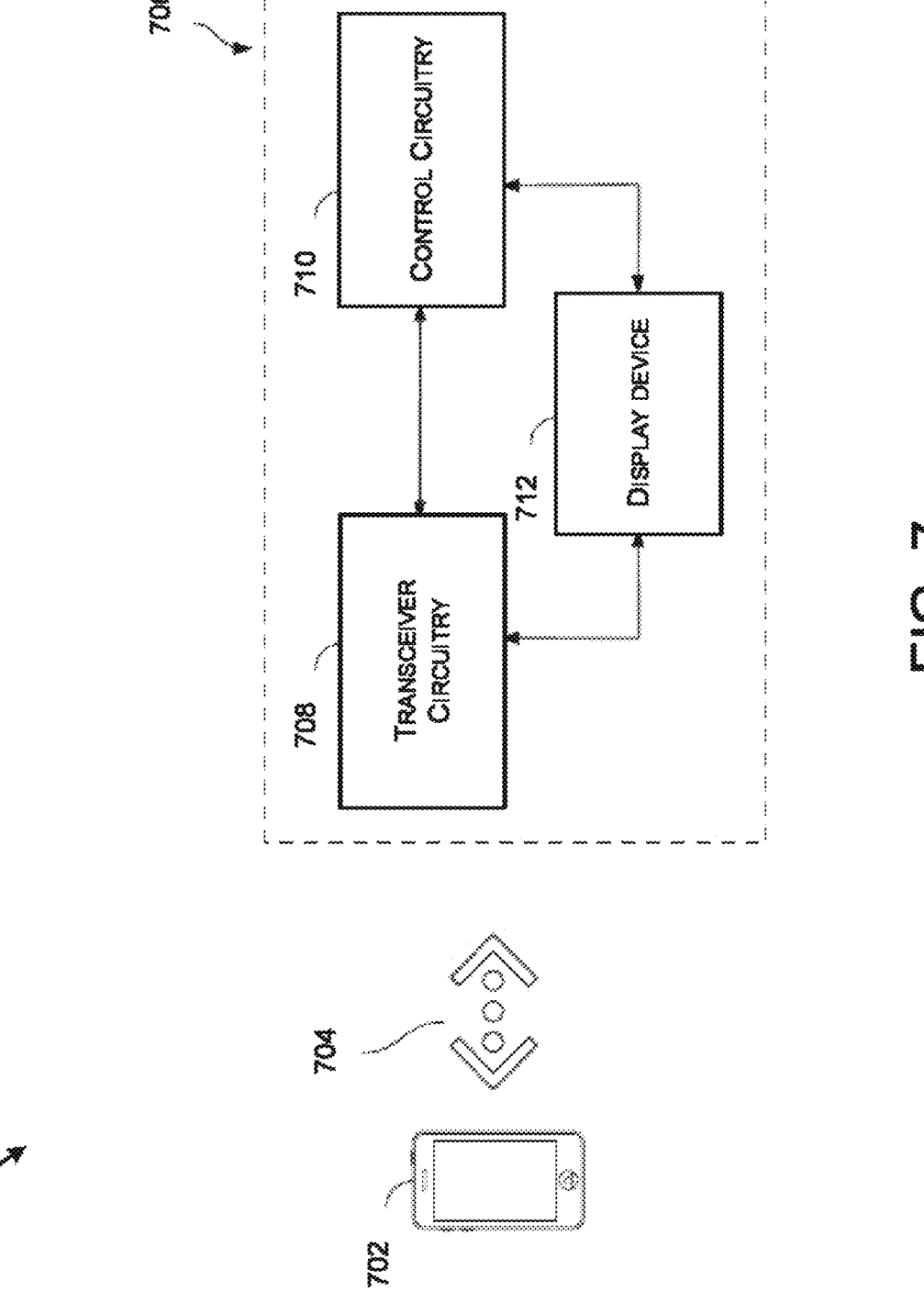
FIG. 7 illustrates an example user device architecture, in accordance with examples of the present disclosure.

FIG. 7 illustrates an example of user device architecture 700, in accordance with examples of the present disclosure.

Referring to FIG. 7, a user device 706 (or 102) comprises transceiver circuitry 708, control circuitry (or processing circuitry or processor) 710, and a display device 712. The user device 706 may communicate with an additional user device 702 (or 104), such as a home gateway, smartphone, or other smart devices. In some examples, the transceiver circuitry 708 is configured to receive a selection of upcoming media topic(s) within a media stream from a user, receive a set of user preferences, receive a user proximity status of the user from the additional user device 702, or the like.

In some examples, the control circuitry 710 is coupled to the transceiver circuitry 708. In some examples, the control circuitry 710 is adapted to determine a status of the upcoming media topic within the media stream to cause a playback of the upcoming media topic and execute one or more actions to indicate the playback of the upcoming media topic to the user based on the user preferences.

In some examples, the transceiver circuitry 708 communicates with a second user device 702 via communication link 704. The communication link 704 between the transceiver circuitry 708 and the second user device 702 may comprise a physical connection, facilitated by an input port such as a 3.5 mm jack, RCA jack, Universal Serial Bus (USB) port, Ethernet port, or any other suitable connection for communicating over a wired connection or may comprise a wireless connection via Bluetooth, Wireless-Fidelity (Wi-Fi), WiMAX, Zigbee, Global System for Mobile communication (GSM), Universal Mobile Telecommunications System (UTMS), Code Division Multiple Access (CDMA), Time Division Multiple Access (TDMA), 3G, 4G, 4G Long-Term Evolution (LTE), 5G, or other wireless transmissions as described by the relevant 802.11 wireless communication protocols.

In some examples, the display device 712 may display the media stream, display the upcoming media topics, display a timeline of the upcoming media topic(s) as an icon with an indicator, or the like.

However, these examples are considered to be non-limiting and other combinations of the features herein being spread over two or more devices are considered within the scope of the present disclosure. For example, each of the transceiver module, network module, and control module may be separate Internet of Things (IoT) devices.

Figure 8:
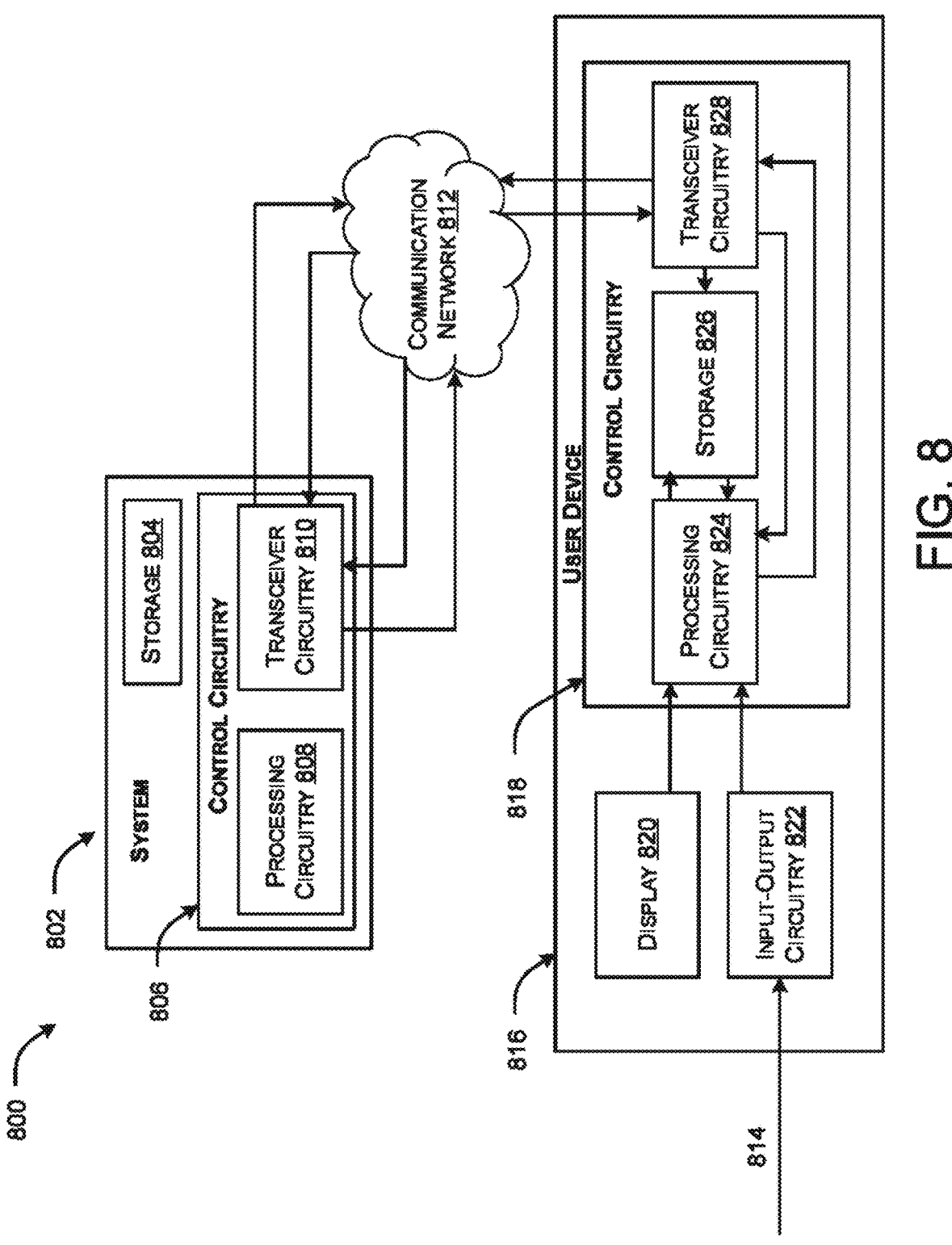
FIG. 8 illustrates a block diagram representing devices, components of each device, and data flow therebetween, in accordance with examples of the present disclosure.

FIG. 8 illustrates a block diagram 800 representing devices, components of each device, and data flow therebetween, in accordance with examples of the present disclosure.

The block diagram 800 is shown to include a user device 816 (or 102, 104), a system 802 (or 108), and a communication network 812. It is understood that while a single instance of a component may be shown and described relative to FIG. 8, additional instances of the component may be employed. For example, the system 802 may include or may be incorporated in, more than one server. Similarly, the communication network 812 may include or may be incorporated in, more than one communication network. The system 802 is shown communicatively coupled to the user device 816 through the communication network 812. While not shown in FIG. 8, the system 802 may be directly communicatively coupled to the user device 816, for example, in a system absent or bypassing the communication network 812.

The communication network 812 may comprise one or more network systems, such as, without limitation, an internet, Local Area Network (LAN), Wi-Fi, or other network systems suitable for audio processing applications. In some examples, the block diagram 800 excludes the system 802, and functionality that would otherwise be implemented by the system 802 is instead implemented by other components of the block diagram 800, such as one or more components of the communication network 812. In still other examples, the system 802 works in conjunction with one or more components of the communication network 812 to implement certain functionalities described herein in a distributed or cooperative manner. Similarly, in some examples, the block diagram 800 excludes the user device 816, and functionality that would otherwise be implemented by the user device 816 is instead implemented by other components of the block diagram 800, such as one or more components of the communication network 812 or the system 802 or a combination thereof. In still other examples, the user device 816 works in conjunction with one or more components of the communication network 812 or the system 802 to implement certain functionality described herein in a distributed or cooperative manner.

Referring to FIG. 8, the user device 816 includes control circuitry 818, display 820, and input-output circuitry 822. The control circuitry 818 in turn includes transceiver circuitry 828, storage 826, and processing circuitry 824.

The system 802 includes control circuitry 806 and storage 804. Each of the storages 804 and 826 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, Blu-Ray disc (BD) recorders, Blu-Ray 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each storage 804, 826 may be used to store various types of objects, user preferences, 3D models, or other types of data. The non-volatile memory may also be used (e.g., to launch a boot-up routine and other instructions). Cloud-based storage may be used to supplement storages 802, 826 or instead of storages 802, 826.

In some examples, control circuitry 806 and/or 818 executes instructions for an application stored on the memory (e.g., storage 804 and/or storage 826). Specifically, control circuitry 806 and/or 818 may be instructed by the application to perform the functions discussed herein. In some implementations, any action performed by control circuitry 806 and/or 818 may be based on instructions received from the application. For example, the application may be implemented as software or a set of executable instructions that may be stored on storage 804 and/or 826 and executed by control circuitry 806 and/or 818. In some examples, the application may be a client/server application, where only a client application resides on user device 816, and a server application resides on system 802.

The application may be implemented using any suitable architecture. For example, it may be a stand-alone application wholly implemented on user device 816. In such an approach, instructions for the application are stored locally (e.g., in storage 826), and data for use by the application is downloaded periodically (e.g., from an out-of-band feed, from an Internet resource, or using another suitable approach). The control circuitry 818 may retrieve instructions for the application from storage 826 and process the instructions to perform the functionality described herein. Based on the processed instructions, control circuitry 818 may determine a type of action to perform in response to input received from the input/output path (or the input-output circuitry) 822 or the communication network 812. For example, in response to a maximum network bandwidth, control circuitry 818 may perform the steps of processes relative to various examples discussed herein.

In client/server-based examples, control circuitry 818 may include communication circuitry suitable for communicating with an application server (e.g., system 802) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 812). In another example of a client/server-based application, control circuitry 818 runs a web browser that interprets web pages provided by a remote server (e.g., system 802). For example, the remote server may store the instructions for the application in a storage device. The remote server may process the stored instructions using circuitry (e.g., control circuitry 818) and/or generate displays. The user device 816 may receive the displays generated by the remote server and may display the content of the displays locally via display 820.

This way, the processing of the instructions is performed remotely (e.g., by system 802) while the resulting displays, such as the display windows described elsewhere herein, are provided locally on the user device 816. The user device 816 may receive inputs from the user via the input-output circuitry 822 and transmit those inputs to the remote server for processing and generating the corresponding displays. Alternatively, the user device 816 may receive inputs from the user via input-output circuitry 822 and process and display the received inputs locally, by control circuitry 818 and display 820, respectively.

System 802 and user device 816 may transmit and receive data such as via the communication network 812. The control circuitry 806, 818 may send and receive commands, requests, and other suitable data through communication network 812 using transceiver circuitry 810, 828, respectively. The control circuitry 806, 818 may communicate directly with each other using transceiver circuitry 810, 828, respectively, avoiding communication network 812.

The control circuitry 806 and/or 818 may be based on any suitable processing circuitry such as processing circuitry 808 and/or 824, respectively. As referred to herein, processing circuitry 808 and/or 824 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry 808 and/or 824 may be distributed across multiple separate processors, for example, multiple of the same type of processors (e.g., two Intel Core i9 processors) or multiple different processors (e.g., an Intel Core i7 processor and an Intel Core i9 processor).

The user device 816 receives a user input 814 at the input-output circuitry 822. For example, user device 816 may receive a selection of an object by a gesture like a user swipe or user touch, as previously discussed.

User input 814 may be received from a user selection-capturing interface that is separate from user device 816, such as a remote-control device, trackpad, or any other suitable user movement sensitive or capture devices, or as part of user device 816, such as a touchscreen of display 820. Transmission of user input 814 to user device 816 may be accomplished using a wired connection, such as an audio cable, USB cable, Ethernet cable, or the like attached to a corresponding input port at a local device, or may be accomplished using a wireless connection, such as Bluetooth, Wi-Fi, WiMAX, Zigbee, GSM, UTMS, CDMA, TDMA, 3G, 4G, 4G LTE, 5G, or any other suitable wireless transmission protocol. Input circuitry 822 may comprise a physical input port such as a 3.5 mm audio jack, RCA audio jack, USB port, Ethernet port, or any other suitable connection for receiving audio over a wired connection, or may comprise a wireless receiver configured to receive data via Bluetooth, Wi-Fi, WiMAX, Zigbee, GSM, UTMS, CDMA, TDMA, 3G, 4G, 4G LTE, 5G, or other wireless transmission protocols.

Processing circuitry 824 may receive user input 814 from input-output circuitry 822. Processing circuitry 824 may convert or translate the received user input 814 that may be in the form of gestures or movement to digital signals. In some examples, input-output circuitry 822 performs the translation to digital signals. In some examples, processing circuitry 824 (or processing circuitry 808, as the case may be) carries out disclosed processes and methods.

In some examples, the methods described herein may be performed using the systems described herein. In addition, it is contemplated that the methods described herein may be performed using systems different than the systems described herein. Moreover, the systems described herein may perform the methods described herein and may perform or execute instructions stored in a non-transitory computer-readable storage medium (CRSM). The CRSM may comprise any electronic, magnetic, optical, or other physical storage device that stores executable instructions. The instructions may comprise instructions to cause a processor (such as 202) to perform or control the performance of operations of the proposed methods. It is also contemplated that the systems described herein may perform functions or execute instructions other than those described in relation to the methods and CRSMs described herein.

Furthermore, the CRSMs described herein may store instructions corresponding to the methods described herein and may store instructions which may be performed or executed by the systems described herein. Furthermore, it is contemplated that the CRSMs described herein may store instructions different than those corresponding to the methods described herein and may store instructions which may be performed by systems other than the systems described herein.

The methods, systems, and CRSMs described herein may include the features or perform the functions described herein in association with any one or more of the other methods, systems, and CRSMs described herein.

In some examples, the method or methods described above may be executed or carried out by a computing system including a tangible computer-readable storage medium, also described herein as a storage machine, that holds machine-readable instructions executable by a logic machine (e.g., a processor or programmable control device) to provide, implement, perform, and/or enact the above-described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an Application Programming Interface (API).

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the disclosure. More generally, the above disclosure is meant to be exemplary and not limiting. Only the claims that follow are meant to set bounds as to what the present disclosure includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real-time. It should also be noted that the systems and/or methods described above may be applied to, or used in accordance with, other systems and/or methods.

All the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent, or similar purpose unless expressly stated otherwise. Thus, unless expressly stated otherwise, each feature disclosed is one example only of a generic series of equivalent or similar features.

The disclosure is not restricted to the details of any foregoing examples. The disclosure extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing examples, but also any examples which fall within the scope of the claims.

The reader's attention is directed to all papers and documents which are filed concurrently with or previous to this specification in connection with this application and which are open to public inspection with this specification, and the contents of all such papers and documents are incorporated herein by reference.

The following are illustrative and non-limiting examples that can be combined with one another.

Example 1 comprises a method for providing real-time notifications of media topics within a media stream, the method including receiving, by a processor, a selection of an upcoming media topic within the media stream from a user associated with a first user device in an environment; receiving, by the processor, user preferences for the selected upcoming media topic from the user via the first user device; determining, by the processor, a status of the upcoming media topic within the media stream to cause a playback of the upcoming media topic; and responsive to the determining, executing, by the processor, one or more actions to indicate the playback of the upcoming media topic to the user based on the user preferences.

Example 2 comprises flashing of an indicator on a user interface of the first user device, increasing a volume of the first user device, altering a graphical representation of the selected upcoming media topic on the user interface of the first user device, sending a notification to the user across one or more second user devices within the environment based on the user preferences, and routing the playback of the upcoming media topic on the one or more second user devices based on the user preferences.

Example 3 comprises determining, by the processor, a location of the user within the environment; determining, by the processor, a presence of the user in proximity to a second user device in the environment based on the location of the user, wherein the location of the user may be outside a pre-determined distance range from a location of the first user device; and triggering, by the processor, the second user device to playback the media stream corresponding to the selected upcoming media topic based on the determination of the presence of the user in proximity of the second user device.

Example 4 comprises triggering, by the processor, the second user device may include dynamically generating, by the processor, configuration data corresponding to the second user device, wherein the configuration data may include a start time and an end time of a portion of the media stream corresponding to the selected upcoming media topic; and transmitting, by the processor, the configuration data to the second user device to initiate playback of the portion of the media stream corresponding to the selected upcoming media topic on the second user device.

Example 5 comprises triggering, by the processor, the second user device may include transmitting, by the processor via a central gateway, a multicast address to the second user device; and routing, by the processor via the central gateway, a portion of the media stream corresponding to the selected upcoming media topic on the second user device based on the multicast address.

Example 6 comprises receiving, by the processor, a user proximity status of the user from a second user device within the environment; and routing, by the processor, a portion of the media stream corresponding to the upcoming media topic on the second user device based on the user proximity status.

Example 7 comprises generating, by the processor, a timeline of the upcoming media topic as an icon associated with an indicator, wherein the indicator may correspond to the status of the upcoming media topic; and displaying, by the processor, the timeline as an overlay on the media stream on a user interface of the first user device.

Example 8 comprises dynamically updating, by the processor, the status of the upcoming media topic based on an amount of time elapsed since the detection of the playback of the upcoming media topic.

Example 9 comprises the user preferences may include at least one of identifiers of one or more second user devices for sending a notification of the playback of the upcoming media topic, interruption times, interruption preferences, and at least one user-preferred media topic.

Example 10 comprises generating, by the processor, a set of recommendations of subsequent media topics for the user based at least on the selected upcoming media topic.

Example 11 comprises detecting, by the processor, one or more upcoming media topics within the media stream; and displaying, by the processor, the one or more upcoming media topics on a user interface of the first user device.

Example 12 comprises detecting, by the processor, the one or more upcoming media topics may include analyzing, by the processor, the media stream synchronously, responsive to the analyzing, performing at least one of converting, by the processor, audio information of the media stream into a textual format; analyzing, by the processor, visual transitions in the media stream; and processing, by the processor, at least one of the textual format and the visual transitions to identify one or more keywords or phrases indicating the one or more upcoming media topics within the media stream.

Example 13 comprises executing, on a first user device, one or more actions to indicate that the segment is currently being presented based on a user preference setting.

Example 14 wherein the one or more actions comprise any one or a combination of: providing an indication on a user interface of the first user device, adjusting a volume of the first user device, altering a graphical representation of the presentation status of the segment on the user interface of the first user device, sending a notification to the first user device, and causing the playback of the segment on a second user device.

Example 15 comprises determining a location of a user within a viewing environment; determining a proximity of the user to a second user device in the viewing environment in response to determining that the location of the user is outside a pre-determined distance from a location of the first user device; and causing the second user device to play the segment of the media content item in response to determining that the proximity of the user is within a pre-determined distance to the second user device.

Example 16 wherein causing the second user device to play the segment of the media content item comprises: generating configuration data corresponding to the second user device, wherein the configuration data comprises a start time of a portion of the media content item corresponding to the determined topic; and transmitting the configuration data to the second user device to initiate play of the portion of the media content item at the second user device.

Example 17 wherein causing the second user device to play the segment of the media content item comprises: transmitting, via a central gateway, a multicast address to the second user device; and routing, via the central gateway, a portion of the media content item corresponding to the determined topic to the second user device based on the multicast address.

Example 18 comprises receiving a user proximity status of the user from a second user device within the viewing environment; and routing a portion of the media content item corresponding to the determined topic to the second user device based on the user proximity status.

Example 19 wherein the a user preference setting comprises at least one of: identifiers of one or more second user devices for sending a notification relating to playing a portion of the media content item corresponding to the determined topic, interruption times, interruption preferences, and at least one user-preferred media topic.

Example 20 comprises comprising: generating a set of recommendations of subsequent media topics for the user based at least on the determined media topic.

Example 21 comprises analyzing the media content item synchronously to its transmission; responsive to the analyzing, performing at least one of: converting audio information of the media content item into a textual format; analyzing visual transitions in the media content item; and processing at least one of the textual format and the visual transitions to identify one or more keywords or phrases indicating the one or more upcoming media topics within the media content item.

The invention claimed is:

1. A method for providing real-time notifications of media topics within a media content item, the method comprising:
   analyzing the media content item during output of the media content item on a first device, wherein the media content item is a live media content item;
   based, at least in part, on analyzing the media content item, identifying, using control circuitry, one or more topics that are to appear in a subsequent portion of the media content item;
   generating for display, using control circuitry, one or more identifiers corresponding to the one or more topics on the first device;
   receiving a selection of an identifier of the one or more identifiers corresponding to a particular topic of the one or more topics;
   in response to receiving the selection, generating for display, using control circuitry, a timeline indicating a presentation status of a particular segment corresponding to the particular topic on the first device;
   determining, using control circuitry, whether the output of the media content item has reached the particular segment; and
   in response to determining that the output of the media content item has reached the particular segment:
      updating, using control circuitry, the presentation status of the particular segment on the timeline; and
      transmitting a notification indicating that the output of the media content item has reached the particular segment.

2. The method of claim 1, further comprising:
   executing, on the first device, one or more actions to indicate that the output of the media content item has reached the particular segment based on a user preference setting.

3. The method of claim 2, wherein the one or more actions comprise any one or a combination of: providing an indication on a user interface of the first device, adjusting a volume of the first device, altering a graphical representation of the presentation status of the particular segment on the user interface of the first device, and causing the output of the particular segment on a second device.

4. The method of claim 1, further comprising:
   determining a location of a user within a viewing environment;
   determining a proximity of the user to a second device in the viewing environment in response to determining that the location of the user is outside a pre-determined distance from a location of the first device; and
   causing the second device to play the particular segment of the media content item in response to determining that the proximity of the user is within a pre-determined distance to the second device.

5. The method of claim 4, wherein causing the second device to play the particular segment of the media content item comprises:
   generating configuration data corresponding to the second device, wherein the configuration data comprises a start time of the particular segment within the media content item; and
   transmitting the configuration data to the second device to initiate play of the particular segment of the media content item at the second device.

6. The method of claim 4, wherein causing the second device to play the particular segment of the media content item comprises:
   transmitting, via a central gateway, a multicast address to the second device; and
   routing, via the central gateway, a portion of the media content item corresponding to the particular topic to the second device based on the multicast address, wherein the portion comprises the particular segment.

7. The method of claim 2, wherein the user preference setting comprises at least one of: identifiers of one or more second devices for sending a notification relating to playing a portion of the media content item corresponding to the particular topic, interruption times, interruption preferences, and at least one user-preferred media topic.

8. The method of claim 1, further comprising:
   generating a set of recommendations of subsequent topics within the media content item based at least in part on the particular topic.

9. The method of claim 1, wherein analyzing the media content item comprises performing at least one of:
   converting audio information of the media content item into a textual format;
   analyzing visual transitions in the media content item; and
   processing at least one of the textual format and the visual transitions to identify one or more keywords or phrases indicating the one or more upcoming topics within the media content item.

10. A system for providing real-time notifications of media topics within a media content item, the system comprising control circuitry configured to:
   analyze the media content item during output of the media content item on a first device, wherein the media content item is a live media content item;
   based, at least in part, on analyzing the media content item, identify one or more topics that are to appear in a subsequent portion of the media content item;
   generate for display one or more identifiers corresponding to the one or more topics on the first device;
   receive a selection of an identifier of the one or more identifiers corresponding to a particular topic of the one or more topics;
   in response to receiving the selection, generate for display a timeline indicating a presentation status of a particular segment corresponding to the particular topic on the first device;
   determine whether output of the media content item has reached the particular segment; and
   in response to determining that the output of the media content item has reached the particular segment:
      update the presentation status of the particular segment on the timeline;
      transmit a notification indicating that the output of the media content item has reached the particular segment.

11. The system of claim 10, wherein the control circuitry is configured to:
   execute, on the first device, one or more actions to indicate that the output of the media content item has reached the particular segment based on a user preference setting.

12. The system of claim 11, wherein the one or more actions comprise any one or a combination of: providing an indication on a user interface of the first device, adjusting a volume of the first device, altering a graphical representation of the presentation status of the particular segment on the user interface of the first device, and causing the output of the particular segment on a second device.

13. The system of claim 10, wherein the control circuitry is configured to:

determine a location of a user within a viewing environment;

determine a proximity of the user to a second device in the viewing environment in response to determining that the location of the user is outside a pre-determined distance from a location of the first device; and cause the second device to play the particular segment of the media content item in response to determining that the proximity of the user is within a pre-determined distance to the second device.

14. The system of claim 13, wherein the control circuitry is configured to:

generate configuration data corresponding to the second device, wherein the configuration data comprises a start time of the particular segment within the media content item; and transmit the configuration data to the second device to initiate play of the particular segment of the media content item at the second device.

15. The system of claim 13, wherein the control circuitry is configured to:

transmit, via a central gateway, a multicast address to the second device; and route, via the central gateway, a portion of the media content item corresponding to the particular topic to the second device based on the multicast address, wherein the portion comprises the particular segment.

16. The system of claim 11, wherein the user preference setting comprises at least one of: identifiers of one or more second devices for sending a notification relating to playing a portion of the media content item corresponding to the particular topic, interruption times, interruption preferences, and at least one user-preferred media topic.

17. The system of claim 10, wherein the control circuitry is configured to:

generate a set of recommendations of subsequent topics within the media content item based at least in part on the particular topic.

18. The system of claim 10, wherein the control circuitry is configured to analyze the media content item by:

converting audio information of the media content item into a textual format;

analyzing visual transitions in the media content item; and processing at least one of the textual format and the visual transitions to identify one or more keywords or phrases indicating the one or more upcoming topics within the media content item.

19. The method of claim 1, wherein:

generating for display the timeline indicating the presentation status of the particular segment comprises generating for display a timepoint estimating a start time of the particular segment within the media content item; and updating the presentation status of the particular segment comprises updating the timepoint to a time when the output of the media content item reached the particular segment.

20. The system of claim 10, wherein control circuitry is configured to:

generate for display the timeline indicating the presentation status of the particular segment by generating for display a timepoint estimating a start time of the particular segment within the media content item; and update the presentation status of the particular segment by updating the timepoint to a time when the output of the media content item reached the particular segment.

* * * * *